United States Patent
Omura et al.

(10) Patent No.: US 9,866,611 B2
(45) Date of Patent: Jan. 9, 2018

(54) DISPLAY APPARATUS AND DISPLAY SYSTEM

(71) Applicants: Katsuyuki Omura, Tokyo (JP); Kiyoshi Kasatani, Kanagawa (JP)

(72) Inventors: Katsuyuki Omura, Tokyo (JP); Kiyoshi Kasatani, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 459 days.

(21) Appl. No.: 14/477,086

(22) Filed: Sep. 4, 2014

(65) Prior Publication Data

US 2015/0067532 A1    Mar. 5, 2015

(30) Foreign Application Priority Data

Sep. 5, 2013   (JP) ................................ 2013-183717
Apr. 23, 2014  (JP) ................................ 2014-088994

(51) Int. Cl.
*G06F 1/16*     (2006.01)
*H04L 29/08*    (2006.01)
*G06F 3/14*     (2006.01)

(52) U.S. Cl.
CPC ............ *H04L 67/02* (2013.01); *G06F 1/1601* (2013.01); *G06F 1/1605* (2013.01); *G06F 3/1431* (2013.01); *G06F 3/1446* (2013.01); *G09G 2300/026* (2013.01)

(58) Field of Classification Search
CPC .... G06F 3/1431; G06F 3/1446; G06F 1/1605; G06F 1/1601; H04L 67/02; G09G 2300/026
See application file for complete search history.

(56) References Cited

U.S. PATENT DOCUMENTS

| | | | |
|---|---|---|---|
| 4,713,534 A | 12/1987 | Masters et al. | |
| 6,128,117 A * | 10/2000 | Kim | .................... H04B 10/801 398/1 |
| 6,252,658 B1 * | 6/2001 | Togawa | ............. G01N 15/0211 356/335 |
| 6,421,042 B1 | 7/2002 | Omura et al. | |
| 6,429,856 B1 | 8/2002 | Omura et al. | |
| 6,518,960 B2 | 2/2003 | Omura et al. | |
| 6,563,491 B1 | 5/2003 | Omura | |

(Continued)

FOREIGN PATENT DOCUMENTS

| | | |
|---|---|---|
| JP | 2678231 | 11/1997 |
| JP | H11-259235 | 9/1999 |

(Continued)

OTHER PUBLICATIONS

Partial European Search Report dated Jan. 27, 2015 for corresponding EP Application No. 14182541.4.

(Continued)

*Primary Examiner* — Sara England
(74) *Attorney, Agent, or Firm* — Harness, Dickey & Pierce, P.L.C.

(57) ABSTRACT

A display apparatus includes a detecting unit that detects terminal position information including information concerning a position of another display apparatus with respect to the display apparatus; and a display unit that displays a part of a given image based on the terminal position information detected by the detecting unit.

11 Claims, 33 Drawing Sheets

(56) References Cited

U.S. PATENT DOCUMENTS

| | | | |
|---|---|---|---|
| 6,594,023 | B1 | 7/2003 | Omura et al. |
| 6,608,619 | B2 | 8/2003 | Omura et al. |
| 6,760,009 | B2 | 7/2004 | Omura et al. |
| 6,762,747 | B2 | 7/2004 | Fujioka et al. |
| 6,791,700 | B2 | 9/2004 | Omura et al. |
| 7,184,592 | B2 | 2/2007 | Iga et al. |
| 7,312,787 | B2 | 12/2007 | Fujioka et al. |
| 8,280,306 | B2 * | 10/2012 | Oba ................ H04L 63/0492 455/41.2 |
| 2004/0070694 | A1 * | 4/2004 | Haruna ................ G01S 15/872 348/745 |
| 2005/0168399 | A1 | 8/2005 | Palmquist |
| 2007/0067370 | A1 | 3/2007 | Honda et al. |
| 2012/0032976 | A1 | 2/2012 | Nagahara et al. |
| 2012/0050760 | A1 | 3/2012 | Nishida |
| 2012/0062591 | A1 | 3/2012 | Omura et al. |
| 2012/0206387 | A1 | 8/2012 | Omura et al. |
| 2012/0235934 | A1 | 9/2012 | Kawasaki et al. |
| 2013/0033415 | A1 | 2/2013 | Chang et al. |
| 2013/0135263 | A1 | 5/2013 | Omura |
| 2013/0135346 | A1 | 5/2013 | Sakuramata et al. |
| 2013/0222266 | A1 | 8/2013 | Gardenfors et al. |
| 2013/0257816 | A1 | 10/2013 | Omura |
| 2014/0192058 | A1 | 7/2014 | Kodama et al. |

FOREIGN PATENT DOCUMENTS

| | | |
|---|---|---|
| JP | 2005-301131 A | 10/2005 |
| JP | 2008-176802 | 7/2008 |
| JP | 2012-070360 | 4/2012 |
| JP | 5152881 | 2/2013 |
| WO | WO-2005/065180 A2 | 7/2005 |
| WO | WO 2014/142342 | 9/2014 |
| WO | WO 2014/142343 | 9/2014 |
| WO | WO 2014/142354 | 9/2014 |
| WO | WO 2014/142358 | 9/2014 |

OTHER PUBLICATIONS

U.S. Appl. No. 14/189,115, filed Feb. 25, 2014.
U.S. Appl. No. 14/208,213, filed Mar. 13, 2014.
U.S. Appl. No. 14/204,040, filed Mar. 11, 2014.
U.S. Appl. No. 14/208,830, filed Mar. 13, 2014.
U.S. Appl. No. 14/207,788, filed Mar. 13, 2014.
U.S. Appl. No. 14/205,497, filed Mar. 12, 2014.
U.S. Appl. No. 14/207,800, filed Mar. 13, 2014.
U.S. Appl. No. 14/207,764, filed Mar. 13, 2014.
U.S. Appl. No. 14/204,581, filed Mar. 11, 2014.
U.S. Appl. No. 14/205,710, filed Mar. 12, 2014.
Partial European Search Report dated Jan. 21, 2015 for corresponding EP Application No. 14182541.4.

* cited by examiner

FIG.15

| DATA LABEL | ID | DISTANCE |
|---|---|---|
| MyDev | 1000 | Null |
| LeftDev | 1001 | 1000 |
| RightDev | 1002 | 0 |
| UpperDev | Null | Null |
| LowerDev | Null | Null |

| CHECK | SHARED ID | DISPLAY NAME |
|---|---|---|
| | v003 | TOKYO HEAD OFFICE 10F MFP |
| ✓ | v006 | OSAKA EXHIBITION HALL 1F MULTIDISPLAY |
| ⋮ | ⋮ | ⋮ |

DISTRIBUTION DESTINATION
SELECTION MENU

CHECK ANY CONTENT DISTRIBUTION
DESTINATION AND PRESS "OK"

OK   CANCEL

FIG.18

| TERMI-NAL ID | USER CERTIF-ICATE | CONTRACT INFORMATION | TERMINAL TYPE | SETTING INFORMATION (HOME URL) | EXECUTION ENVIRONMENT INFORMATION (FAVORITES) (PREVIOUS COOKIE INFORMATION) (CACHE FILES) | SHARED ID | INSTALLA-TION POSITION | DISPLAY NAME |
|---|---|---|---|---|---|---|---|---|
| t001 | ...... | FHD, 30 FPS, 3-MONTH CONTRACT | NOTEBOOK PC | http://www.rocoh.co.jp | ...... | v001 | – | BEIJING OFFICE 10F RECEPTION TERMINAL |
| t002 | ...... | HD, 30 FPS, 3-MONTH CONTRACT | TABLET TERMINAL | http://www.rocoh.co.jp | ...... | v002 | – | NEW YORK OFFICE 1F LOBBY RECEPTION TERMINAL |
| t003 | ...... | QVGA, 15 FPS, 6 MONTHS | MFP | http://www.rocoh.co.jp | ...... | v003 | – | TOKYO HEAD OFFICE 10F MFP |
| t004 | ...... | WXGA, 15 FPS, 12 MONTHS | PROJEC-TOR | http://www.pontax.co.jp | – | v004 | – | TOKYO HEAD OFFICE 1F LOBBY PROJECTOR |
| t005 | ...... | WXGA, 15 FPS, 6 MONTHS | CAMERA/MICRO-PHONE/SPEAKER | – | – | v005 | – | NAGOYA BRANCH OFFICE 2F TV CONFERENCE ROOM TERMINAL |
| t006 | ...... | FHD, 30 FPS, 12-MONTH CONTRACT | MULTI-DISPLAY | – | – | v006 | LEFT | OSAKA EXHIBITION HALL 1F MULTI-DISPLAY |
| t007 | ...... | FHD, 30 FPS, 12-MONTH CONTRACT | MULTI-DISPLAY | – | – | v006 | MIDDLE | OSAKA EXHIBITION HALL 1F MULTI-DISPLAY |
| t008 | ...... | FHD, 30 FPS, 12-MONTH CONTRACT | MULTI-DISPLAY | – | – | v006 | RIGHT | OSAKA EXHIBITION HALL 1F MULTI-DISPLAY |
| ... | ... | ... | ... | ... | ... | ... | ... | ... |

FIG.19

| TERMINAL ID | SHARED ID |
|---|---|
| t001 | v003 |
| t001 | v006 |
| t002 | v001 |
| ⋮ | ⋮ |

FIG.20

| TERMINAL ID 2301 | DATA LABEL 2302 | ID 2303 | DISTANCE 2304 | ARRANGED POSITION 2305 / 1902 |
|---|---|---|---|---|
| 1000 | LeftDev | 1001 | 1000 | MIDDLE |
|  | RightDev | 1002 | 0 |  |
|  | UpperDev | Null | Null |  |
|  | LowerDev | Null | Null |  |
| 1001 | LeftDev | Null | Null | LEFT |
|  | RightDev | 1000 | 1000 |  |
|  | UpperDev | Null | Null |  |
|  | LowerDev | Null | Null |  |
| 1002 | LeftDev | 1000 | 0 | RIGHT |
|  | RightDev | Null | Null |  |
|  | UpperDev | Null | Null |  |
|  | LowerDev | Null | Null |  |

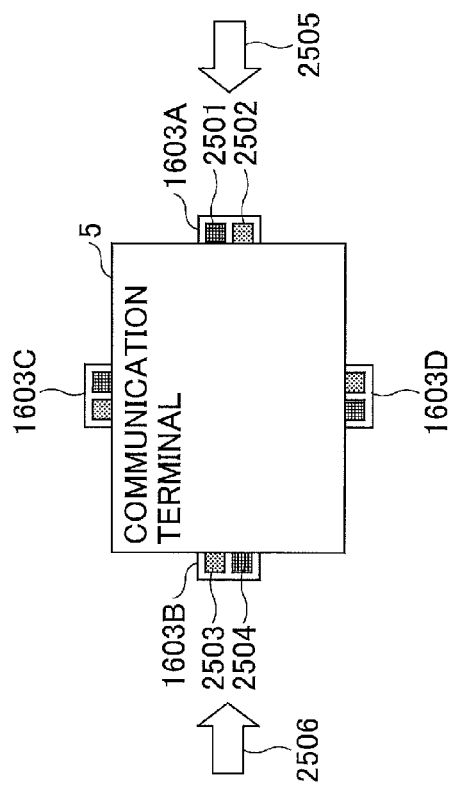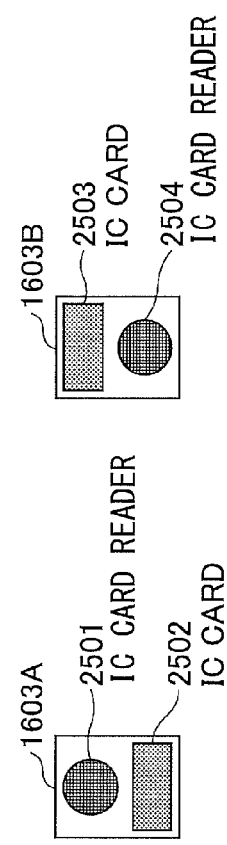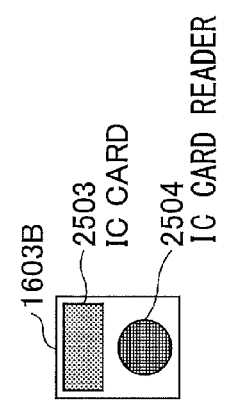

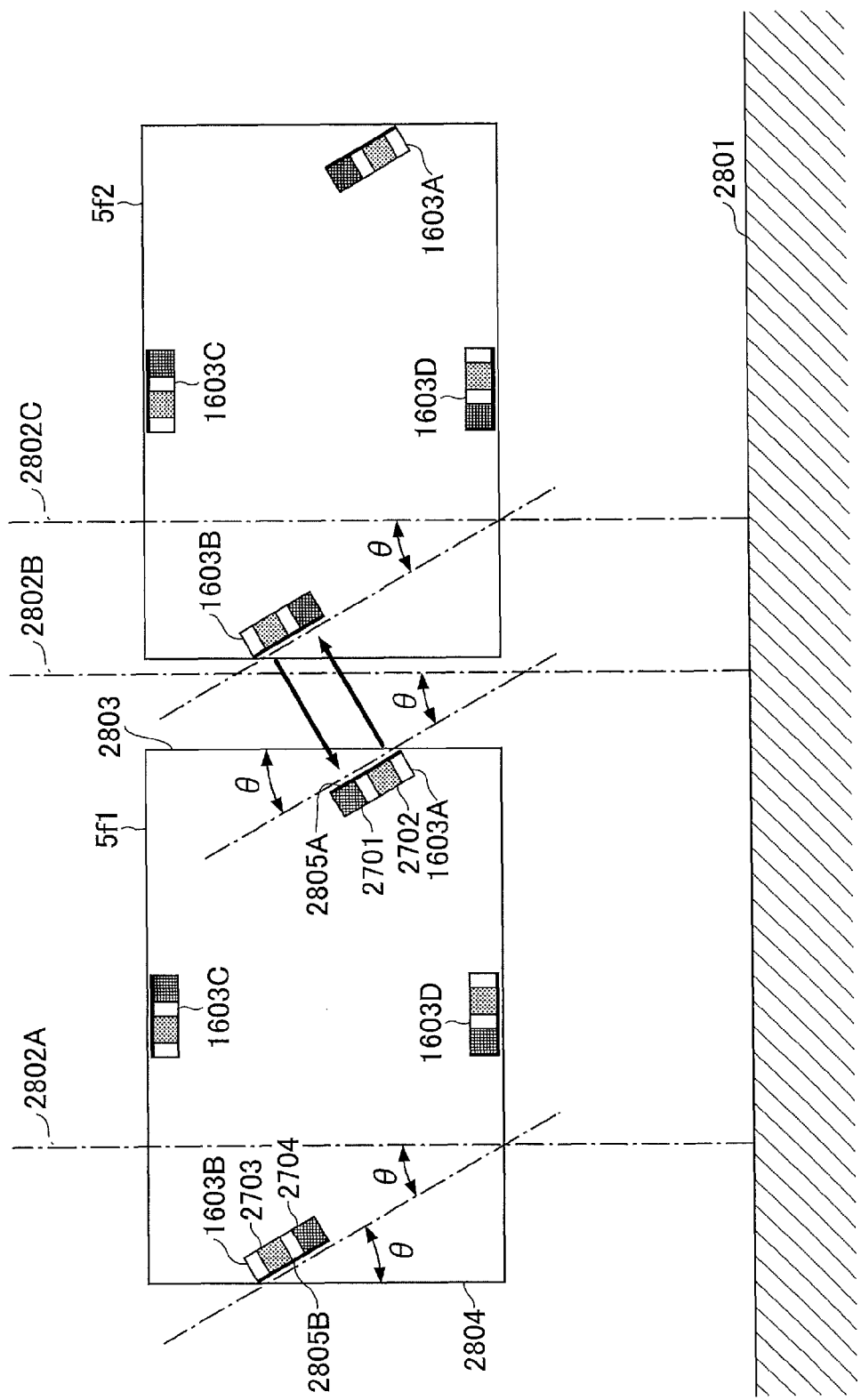

DISPLAY APPARATUS AND DISPLAY SYSTEM

BACKGROUND OF THE INVENTION

1. Field of the Invention

The present invention relates to a display apparatus and a display system.

2. Description of the Related Art

Recently, along with the Internet being widely spread, "cloud computing" is being used in various fields. "Cloud computing" means a system where a user uses various services (cloud services) provided by a server(s) on the Internet by using a communication terminal connected to the Internet.

Further, as one example of "cloud computing", technology is known where information of a system inside a company is transmitted to the outside in a form of images and a user can view the information when the user is outside of the company (for example, see Patent Reference No. 1 (Japanese Patent No. 5152881)).

SUMMARY OF THE INVENTION

According to one aspect of the present invention, a display apparatus includes a detecting unit that detects terminal position information including information concerning a position of another display apparatus with respect to the display apparatus; and a display unit that displays a part of a given image based on the terminal position information detected by the detecting unit.

Other objects, features and advantages of the present invention will become more apparent from the following detailed description when read in conjunction with the accompanying drawings.

BRIEF DESCRIPTION OF THE DRAWINGS

FIG. 15 illustrates one example of terminal position information according to the embodiment;

FIG. 17 is a conceptual diagram of a distribution destination selection menu screen;

FIG. 18 is a conceptual diagram of a terminal management table;

FIG. 19 is a conceptual diagram of an available terminal management table;

FIG. 20 illustrates one example of a terminal arrangement management table;

FIGS. 22A, 22B and 22C illustrate configuration examples of sensor units in a second example according to the embodiment;

FIG. 25 illustrates a configuration example of sensor units in a fourth example of the embodiment;

DETAILED DESCRIPTION OF THE EMBODIMENTS

For example, in cloud computing, in a case where a user has a plurality of display apparatuses, it is possible to more effectively use the display capabilities of the plurality of display apparatuses by displaying a given image by using the plurality of display apparatuses. For example, by adjacently arranging a plurality of tablet terminals vertically or horizontally, it is possible to display an image having a larger size or having a high resolution.

However, in a display system of the related art, in order to display a given image by using a plurality of display apparatuses, a troublesome work may be required such as previously registering an arrangement of the plurality of display apparatuses, setting mutual positional relationship of the plurality of display apparatuses by a user manually, or so.

The embodiment of the present invention has been devised in consideration of this point and an object of the embodiment of the present invention is to provide such a display apparatus that it is possible to easily display a given image by using a plurality of display apparatuses.

Below, using the drawings, a distribution system 1 according to the embodiment of the present invention will be described in detail. Note that the embodiment which will now be described is an example where the present invention is applied to a distribution system of converting web content into video data, sound data or video data and sound data and distributing it to communication terminals such as personal computers, electronic blackboards, and/or the like, using cloud computing. Note that hereinafter, "video (sound)" indicates at least one of video and sound.

Outline of Embodiment

Figure 1:
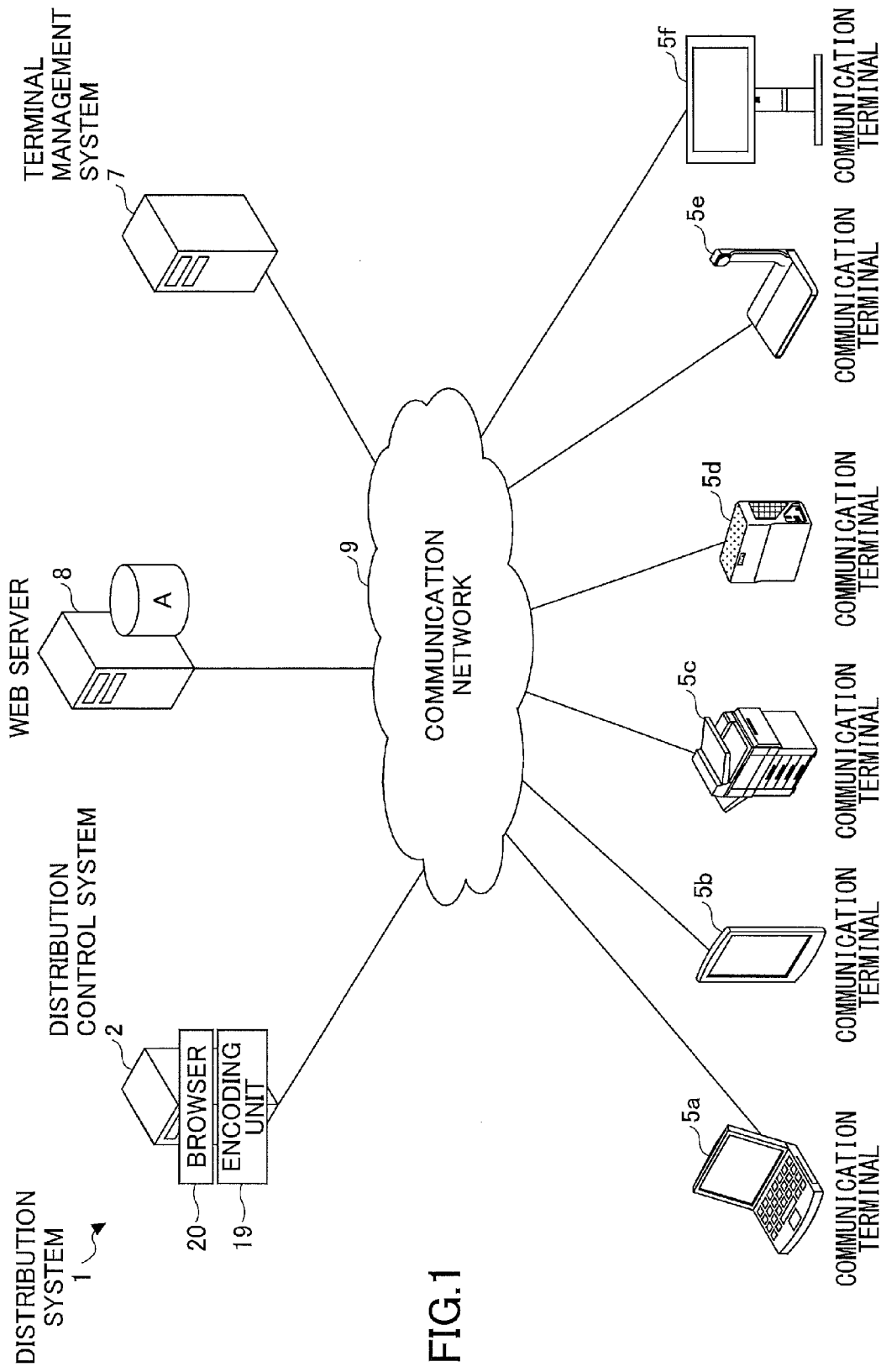
FIG. 1 is a schematic diagram of a distribution system according to an embodiment.

Described with reference to FIG. 1 is an outline of the embodiment according to the present invention. FIG. 1 is a schematic diagram of a distribution system according to the present embodiment.
<Outline of System Configuration>
Described first is an outline of the configuration of the distribution system 1.

As illustrated in FIG. 1, the distribution system 1 according to the present embodiment includes a distribution control system 2, a plurality of the communication terminals 5a-5f, a terminal management system 7 and a web server 8. In the following, any communication terminal among the communication terminals 5a-5f may be represented as a "communication terminal 5". The distribution control system 2, the terminal management system 7 and the web server 8 are implemented by server computers.

A "communication terminal 5" is a terminal used by a user who receives services of the distribution system 1. The communication terminal 5a is a notebook personal computer (PC). The communication terminal 5b is a mobile terminal such as a smartphone or a tablet terminal. The communication terminal 5c is a multifunction peripheral/printer/product (MFP) in which the functions of copying, scanning, printing and faxing are combined. The communication terminal 5d is a projector. The communication terminal 5e is a TV (video) conference terminal having a camera, a microphone and a speaker. The communication terminal 5f is an electronic blackboard (whiteboard) capable of electronically converting drawings drawn by a user or the like.

The communication terminals 5 are not only such terminals as illustrated in FIG. 1, but also may be devices communicable through a communication network such as the Internet, including a watch, a vending machine, a car navigation device, a game machine, an air conditioner, a lighting fixture, a camera alone, a microphone alone, a speaker alone and/or the like.

The distribution control system 2, the communication terminals 5, the terminal management system 7 and the web server 8 can communicate with each other through a communication network 9 such as the Internet and/or a local area network (LAN). The communication network 9 can be or include at least any one of wireless communication networks such as those of 3rd Generation (3G), Worldwide Interoperability for Microwave Access (WiMAX), Long-Term Evolution (LTE) and so forth.

Figure 2:
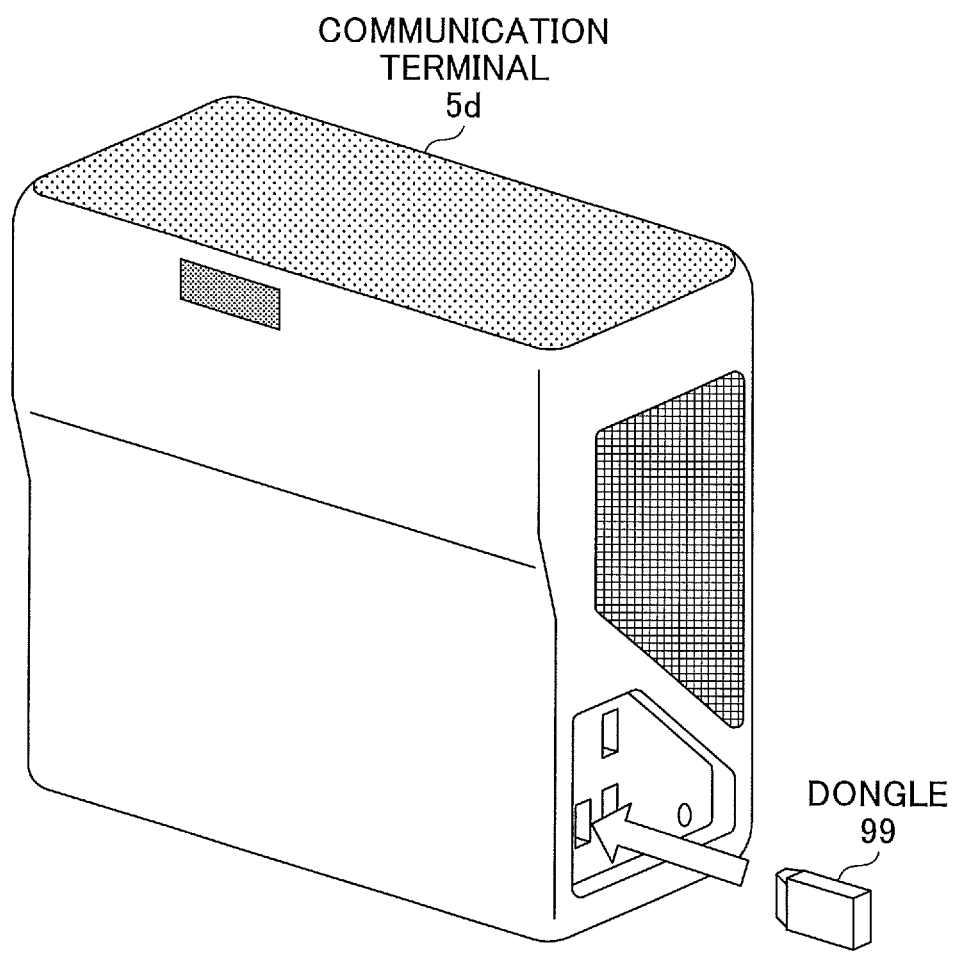
FIG. 2 is a conceptual view when a dongle is attached to a communication terminal.

The communication terminals 5 can include one, like the communication terminal 5d, which does not have a function of communicating with the other terminals and systems through the communication network 9. However, as illustrated in FIG. 2, a user can insert a dongle 99 into an interface of Universal Serial Bus (USB) or High-Definition Multimedia Interface (HDMI) of the communication terminal 5d, allowing the communication terminal 5d to communicate with the other terminals and systems. FIG. 2 is a conceptual view when the dongle 99 is attached to the communication terminal.

The distribution control system 2 has a browser 20 on a cloud, and the function of rendering in the browser 20 acquires one or more pieces of content data described in a certain description language and performs rendering thereon, thereby generating frame data as still image data such as bitmap data made up of red, green and blue (RGB) or sound data such as pulse code modulation (PCM) data (i.e., still image (sound) data). The content data can be data acquired from the web server 8, any communication terminal and the like and can be image data in Hypertext Markup Language (HTML) or Cascading Style Sheets (CSS), image (sound) data in MP4 (MPEG-4), sound data in Advanced Audio Coding (AAC) or the like.

The distribution control system 2 has an encoding unit 19 on the cloud, and the encoding unit 19 plays a role as an encoder, thereby converting pieces of frame data as pieces of still image (sound) data into video (sound) data of the compression coding system such as H.264 (MPEG-4 AVC), H.265 or Motion JPEG.

The terminal management system 7 performs login authentication on a communication terminal 5 and manages contract information and the like of the communication terminal 5. The terminal management system 7 has a function of a Simple Mail Transfer Protocol (SMTP) server for transmitting e-mails. The terminal management system 7 can be embodied as, for example, an imaginary machine developed on a cloud service (IaaS: Infrastructure as a Service). It is preferable that the terminal management system 7 be operated in a multiplexed manner in order to address unexpected incidents to provide continuous service.

The browser 20 enables real-time communication/collaboration (RTC). The distribution control system 2 has the encoding unit 19 in FIG. 11 described below, and the encoding unit 19 can perform real-time encoding on the frame data output by the browser 20 and output video (sound) data generated through conversion based on the H.264 standards or the like. As a result, the process of the distribution control system 2 is different from, for example, a case in which non real-time video (sound) data recorded in a DVD is read and distributed by a DVD player.

Not only the distribution control system 2, but also a communication terminal (s) 5 can have a browser(s). In this case, updating the browser 20 of the distribution control system 2 eliminates the need to start up the browsers of communication terminals 5.
<Outline of Distribution Methods>
Described next is an outline of distribution methods.
(Basic Distribution)

Figure 3:
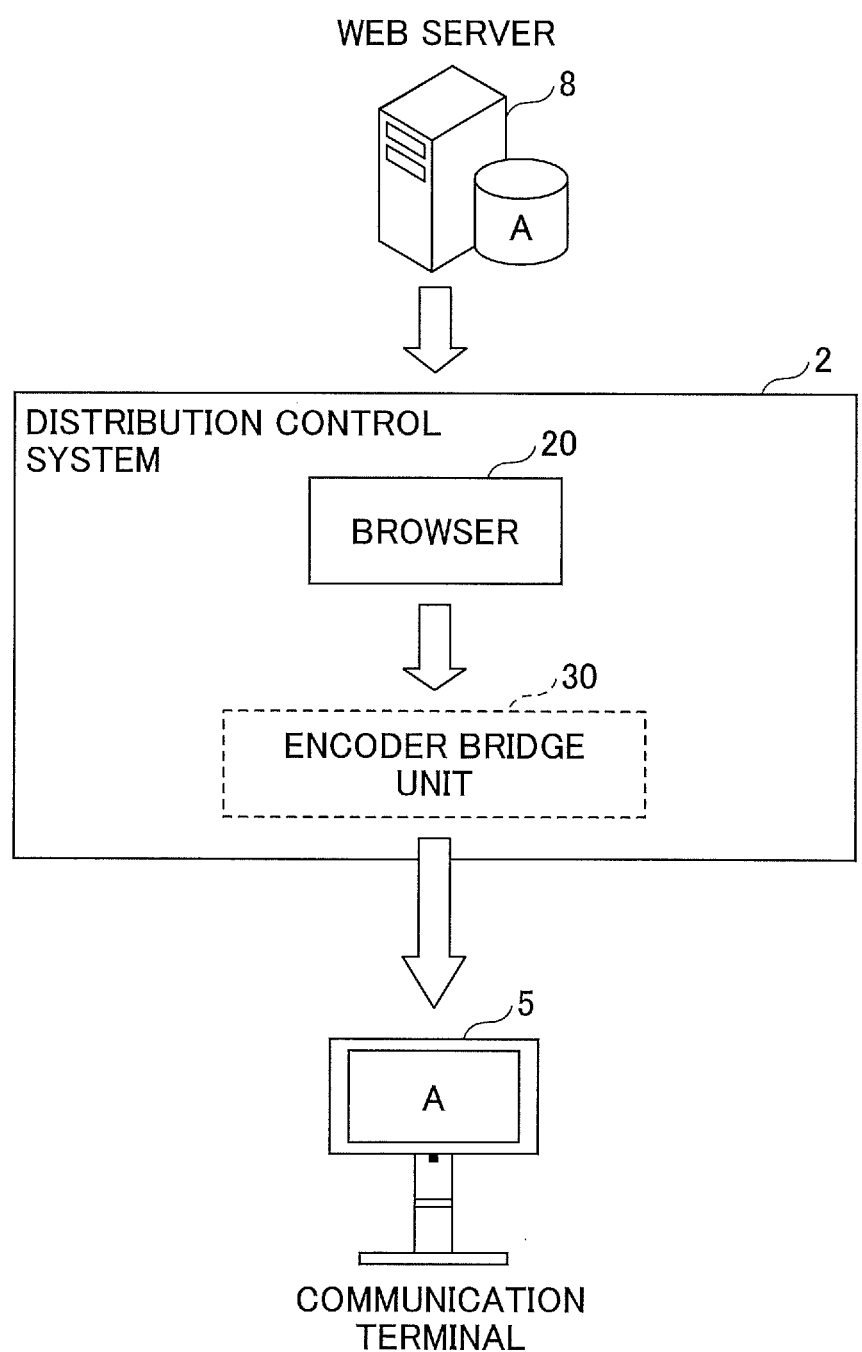
FIG. 3 is a conceptual diagram illustrating a basic distribution method.

FIG. 3 is a conceptual diagram illustrating a basic distribution method. In the distribution system 1, as illustrated in FIG. 3, the browser 20 of the distribution control system 2 acquires web content data [A] as image (sound) data from the web server 8 and renders it, thereby generating pieces of frame data [A] as pieces of still image (sound) data. An encoder bridge unit 30 including the encoding unit 19 performs encoding and the like on the pieces of frame data [A], thereby converting it into video (sound) data of the compression coding system such as H.264. The distribution control system 2 distributes the video (sound) data [A] after being converted (an example of transmission data) to a communication terminal 5.

Thus, the distribution control system 2 can distribute even rich web content data to a communication terminal 5 while converting it from the web content data in HTML or the like into the compressed video (sound) data in H.264 or the like on the cloud. As a result, the web content can be smoothly reproduced on the communication terminal 5 side without time and effort and costs for improving the specification of a central processing unit (CPU), an operating system (OS) and the like.

Even when the enrichment of web content progresses in the future, because only the specifications of the browser 20, the CPU and the like in the distribution control system 2 on the cloud have to be improved, the specifications of the communication terminals 5 do not need to be improved.

Figure 4:
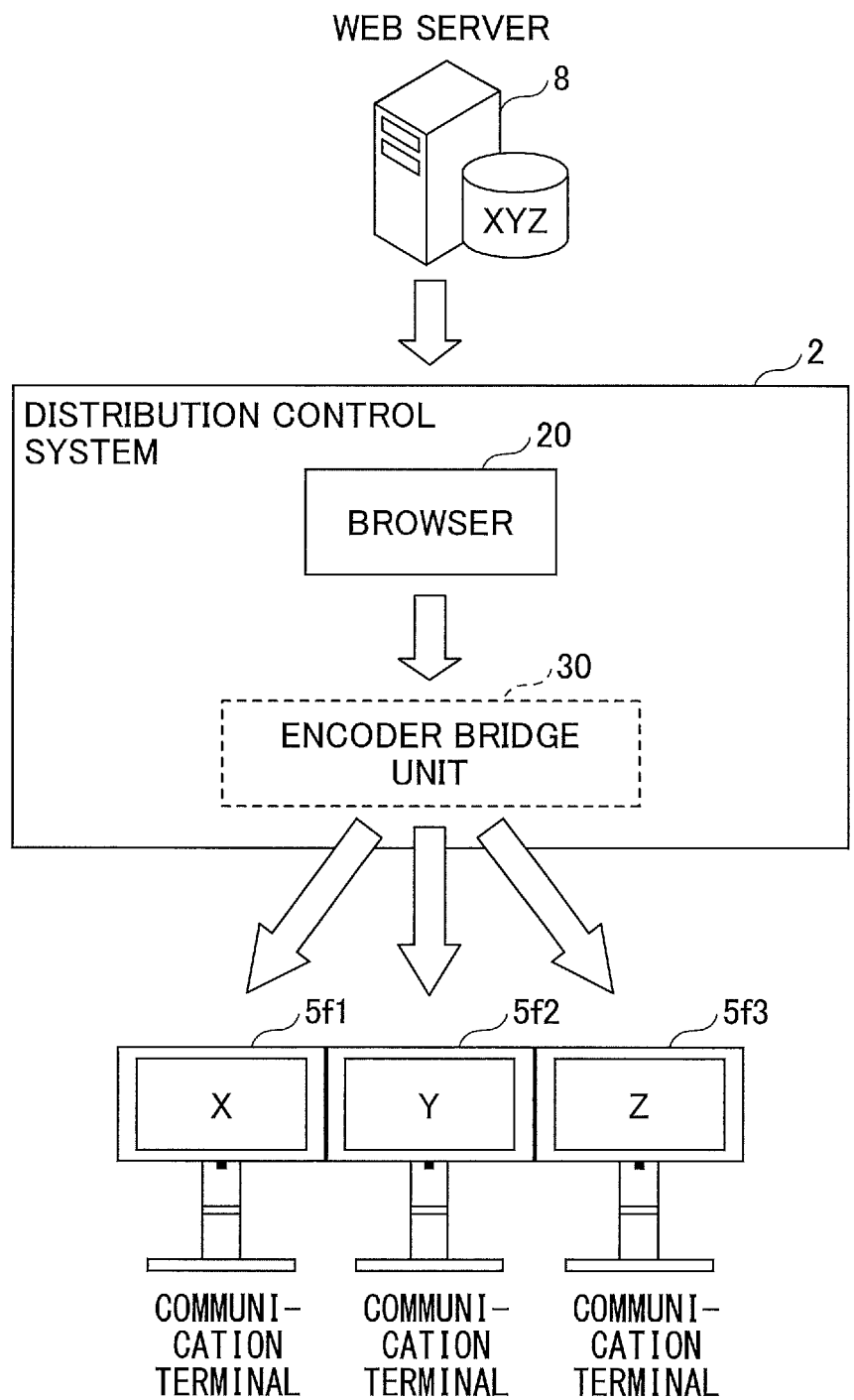
FIG. 4 is a conceptual diagram of "multidisplay"

Applying the above distribution method, as illustrated in FIG. 4, the distribution system 1 also can distribute web content data to a plurality of sites as video (sound) data. Described here is a distribution method illustrated in FIG. 4.

(Multidisplay)

FIG. 4 is a conceptual diagram of "multidisplay". As illustrated in FIG. 4, the single browser 20 of the distribution control system 2 acquires web content data [XYZ] as image (sound) data from the web server 8 and renders it, thereby generating pieces of frame data [XYZ] as pieces of still image (sound) data. For each frame data [XYZ], the encoder bridge unit 30 divides it into a plurality of pieces of frame data ([X], [Y], [Z]) and then encodes them, thereby converting it into a plurality of pieces of video (sound) data ([X], [Y], [Z]). The distribution control system 2 then distributes the video (sound) data [X] to the communication terminal 5/1. Similarly, the distribution control system 2 distributes the video (sound) data [Y] to the communication terminal 5/2 and distributes the video (sound) data [Z] to the communication terminal 5/3.

Thus, for example, even for landscape web content [XYZ], video (sound) is reproduced by the communication terminals 5 in a divided manner. As a result, when the communication terminals (5/1, 5/2 and 5/3) are installed in a line (side by side or so), the same effect as the reproduction of one piece of large video can be obtained. In this case, the communication terminals (5/1, 5/2 and 5/3) need to have the same display reproduction capability (e.g., the same resolution). The distribution method like this is called, for example, "multidisplay".

DETAILED DESCRIPTION OF EMBODIMENT

Next, the embodiment will be described in detail using FIGS. 5-35.
<Hardware Configuration>
First, using FIGS. 5, 6 and 7, hardware configuration of the embodiment will be described.
(Communication Terminal)

Figure 5:
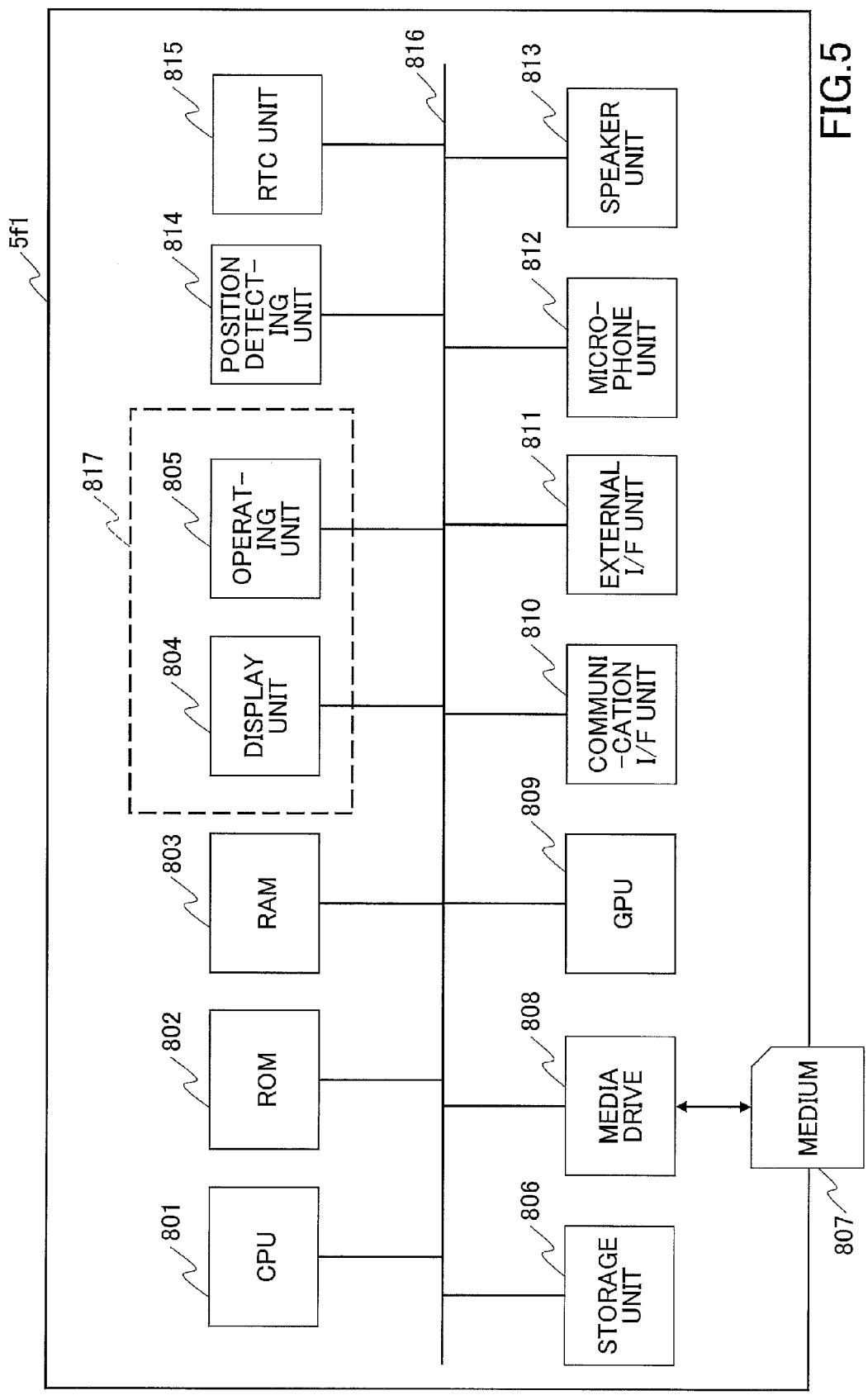
FIG. 5 is a hardware configuration diagram of a the communication terminal according to one embodiment.

FIG. 5 is a hardware configuration diagram of the communication terminal 5/1 according to the embodiment. Also the communication terminals 5/2 and 5/3 have the same configurations. Note that the communication terminals 5/1, 5/2 and 5/3 are examples of "display apparatuses".

The communication terminal 5/1 includes a configuration of a common computer, and, for example, includes a Central Processing Unit (CPU) 801, a Read-Only Memory (ROM) 802, a Random Access Memory (RAM) 803, a display unit 804, an operating unit 805, a storage unit 806, a medium drive 808, a Graphic Processing Unit (GPU) 809, a communication InterFace (IF) unit 810, an external I/F unit 811, a microphone unit 812, a speaker unit 813, a position detecting unit 814, a Real Time Clock (RTC) unit 815, a bus line 816 and so forth.

The CPU 801 is a processor, reads a program and data of the communication terminal 5/1 from the ROM 802, the storage unit 806 or so, carries out a process to implement various functions of the communication terminal 5/1. The ROM 802 is a nonvolatile memory such as a flash ROM storing a program, data and so forth to be used for controlling the communication terminal 5/1. The RAM 803 is a volatile memory used as a work area of the CPU 801.

The display unit 804 displays various sorts of information and includes, for example, a display device such as a liquid crystal display device, an organic Electro-Luminescence (EL) display device or the like, a display control circuit therefor and so forth. The operating unit 805 is used by a user to carry out various sorts of operations such as inputting various data, selection and so forth and includes, for example, a keyboard, a mouse, a touch pad, an operation panel and/or the like. Note that the display unit 804 and the operating unit 805 can be integrated into a display and operating unit 817 such as a touch panel display unit.

The storage unit 806 stores, for example, programs such as an Operating System (OS) and various sorts of applications, and various data. The storage unit 806 includes, for example, a storage device such as a Hard Disk Drive (HDD), a Solid State Drive (SSD), a flash ROM or the like and a control circuit therefor. The medium drive 808 controls reading information from and writing (storing) information into a recording medium 807 such as a flash memory. The GPU 809 is a processor carrying out image processing.

The communication I/F unit 810 is an interface for carrying out transmission and reception of data by using the communication network 9 such as a wired or wireless LAN, a wireless communication network such as 3G, LTE, WiMAX or the like mentioned above. The external I/F unit 811 includes a data interface such as a USB interface.

The microphone unit 812 includes a microphone collecting surrounding sound, an input circuit converting a signal of thus collected sound into a predetermined sound data, and so forth. The speaker unit 813 includes an output circuit for converting sound data to be output into a sound signal, a speaker outputting the sound signal as sound and so forth. Note that at least part of the microphone unit 812 and the speaker unit 813 can be provided outside the communication terminal 5/1.

The position detecting unit 814 detects the relative position of another communication terminal 5 when the other communication terminal 5 or so is adjacently placed, or so. Details of the position detecting unit 814 will be described later.

The RTC unit 815 has a clock function continuing to operate even after the power supply in the communication terminal 5*f* is turned off and outputs time information such as the current time, date, and so forth, in response to a request from the CPU 801 or so. The RTC unit 815 also has a function of outputting a predetermined signal (for example, an interrupt signal) at a predetermined time, at a predetermined time interval, or so, according to a given setting(s). The bus line 816 is connected with the above-mentioned respective elements in common and transmits address signals, data signals, various control signals and so forth.

(Distribution Control System, Terminal Management System and Web Server)

Figure 6:
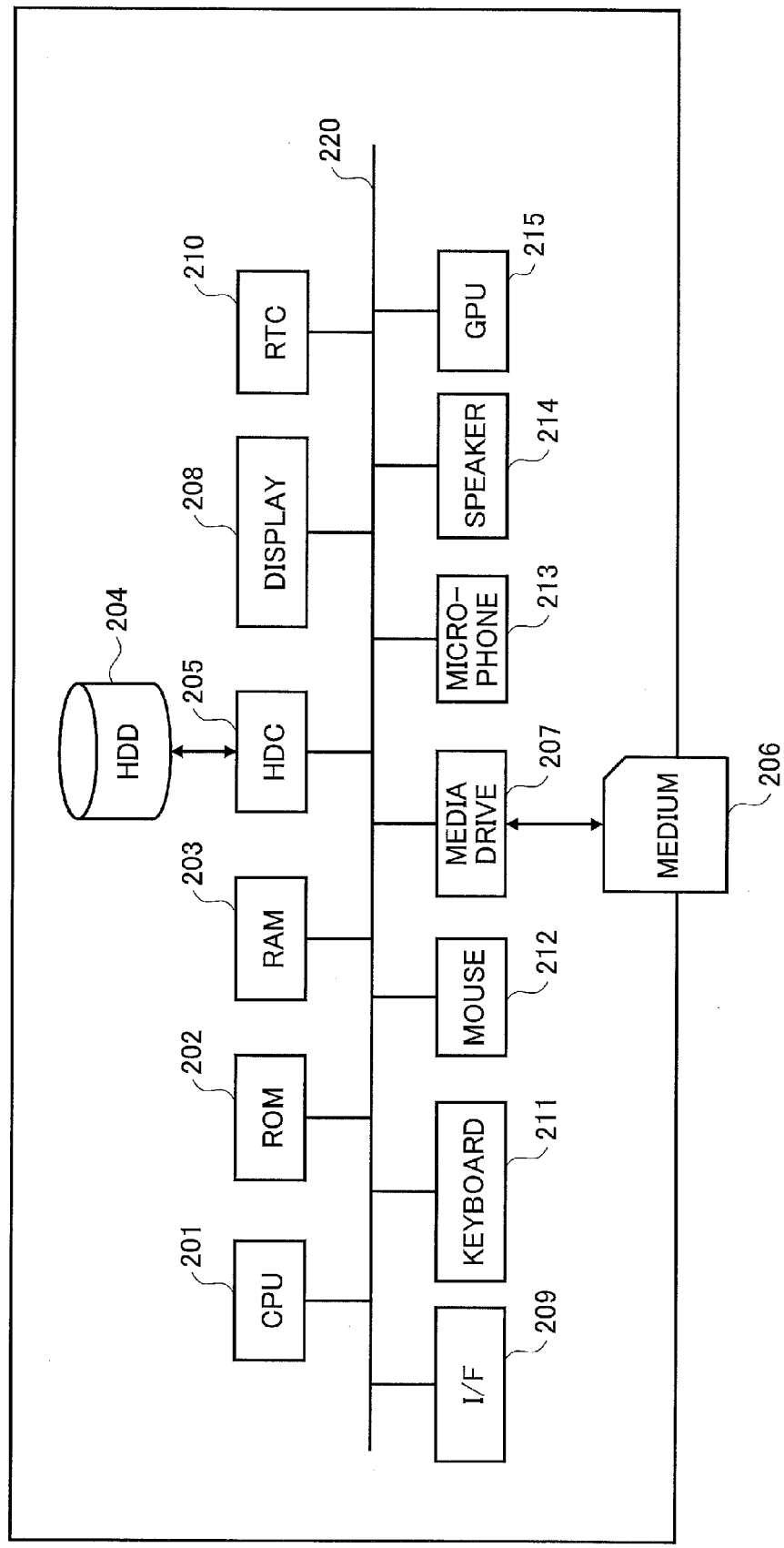
FIG. 6 is a hardware configuration diagram of a distribution control system, a terminal management system and a web server according to the embodiment.
Figure 7:
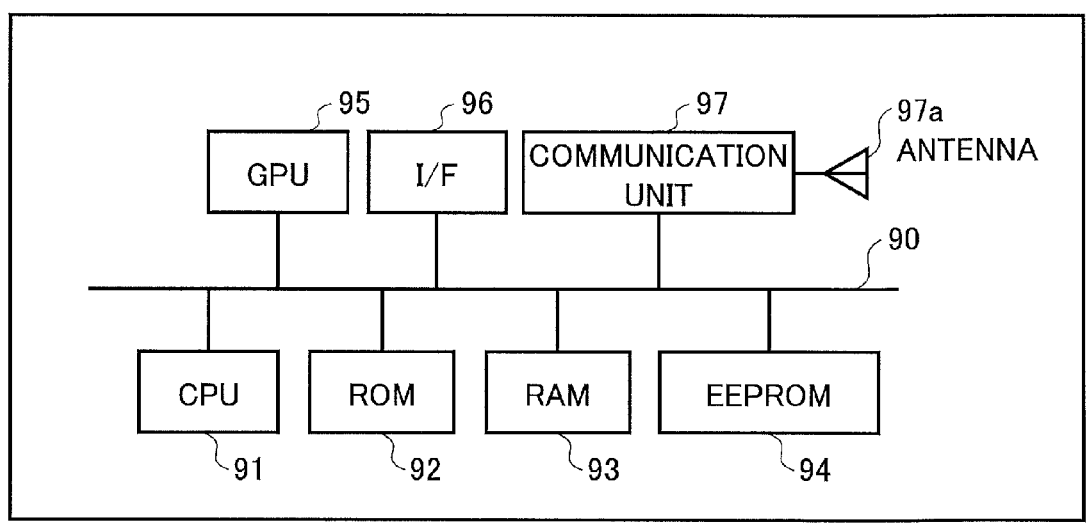
FIG. 7 is a hardware configuration diagram of a dongle according to the embodiment.

FIG. 6 is a hardware configuration diagram of the distribution control system 2, the terminal management system 7 and the web server 8 according to the embodiment. Each of the distribution control system 2, the terminal management system 7 and the web server 8 has a configuration of a common computer and has the same configuration. Therefore, hereinafter, the distribution control system 2 will be described whereas description of the terminal management system 7 and the web server 8 will be omitted.

As illustrated in FIG. 6, the distribution control system 2 includes a CPU 201 controlling the entirety of the distribution control system 2, a ROM 202 storing a program such as an IPL to be used for driving the CPU 201, a RAM 203 to be used as a work area of the CPU 201, a HDD 204 storing programs and various data, a Hard Disk Controller (HDC) 205 controlling writing various data into and reading various data from the HDD 204 under the control of the CPU 201, a medium drive 207 controlling reading data from and writing (storing) data into a recording medium 206 such as a flash memory, a display unit 208 displaying various information, an I/F 209 for transmitting data via the communication network 9 and/or connecting the dongle 99, an RTC 210 having a time function to output information concerning date, time and/or the like, a keyboard 211, a mouse 212, a microphone 213, a speaker 214, a GPU 215 and a bus line 220 such as a data bus and an address bus connecting the above-mentioned respective elements electrically as illustrated in FIG. 6. Note that there is also a case where no GPU is provided as in the communication terminal 5d as a projector.

(Dongle)

Using FIG. 7, the hardware configuration of the dongle 99 illustrated in FIG. 2 will be described. As illustrated in FIG. 7, the dongle 99 includes a CPU 91 controlling the entirety of the dongle 99, a ROM 92 storing a basic input/output program, a RAM 93 used as a work area of the CPU 91, an Electrically Erasable and Programmable ROM (EEPROM) 94 reading data and writing data under the control of the CPU 91, a GPU 95, an interface I/F 96 for connecting to the I/F 209 of a communication terminal 5, an antenna 97a, a communication unit 97 carrying out communication according to short distance wireless technology using the antenna 97a and bus lines 90 such as address buses and data buses for connecting the above-mentioned various elements. The short distance wireless technology can be, for example, the Near Field Communication (NFC) standard, Bluetooth (registered trademark), Wireless Fidelity (WiFi) (registered trademark), ZigBee (registered trademark) or the like. Since the GPU is provided in the dongle 99, the communication terminal 5d can carry out a necessary calculation process for graphic display as a result of being connected with the dongle 99 as illustrated in FIG. 2 even when no GPU is provided as in the communication terminal 5d.

<Functional Configuration>

Next, the functional configuration of the present embodiment will be described.

Figure 8:
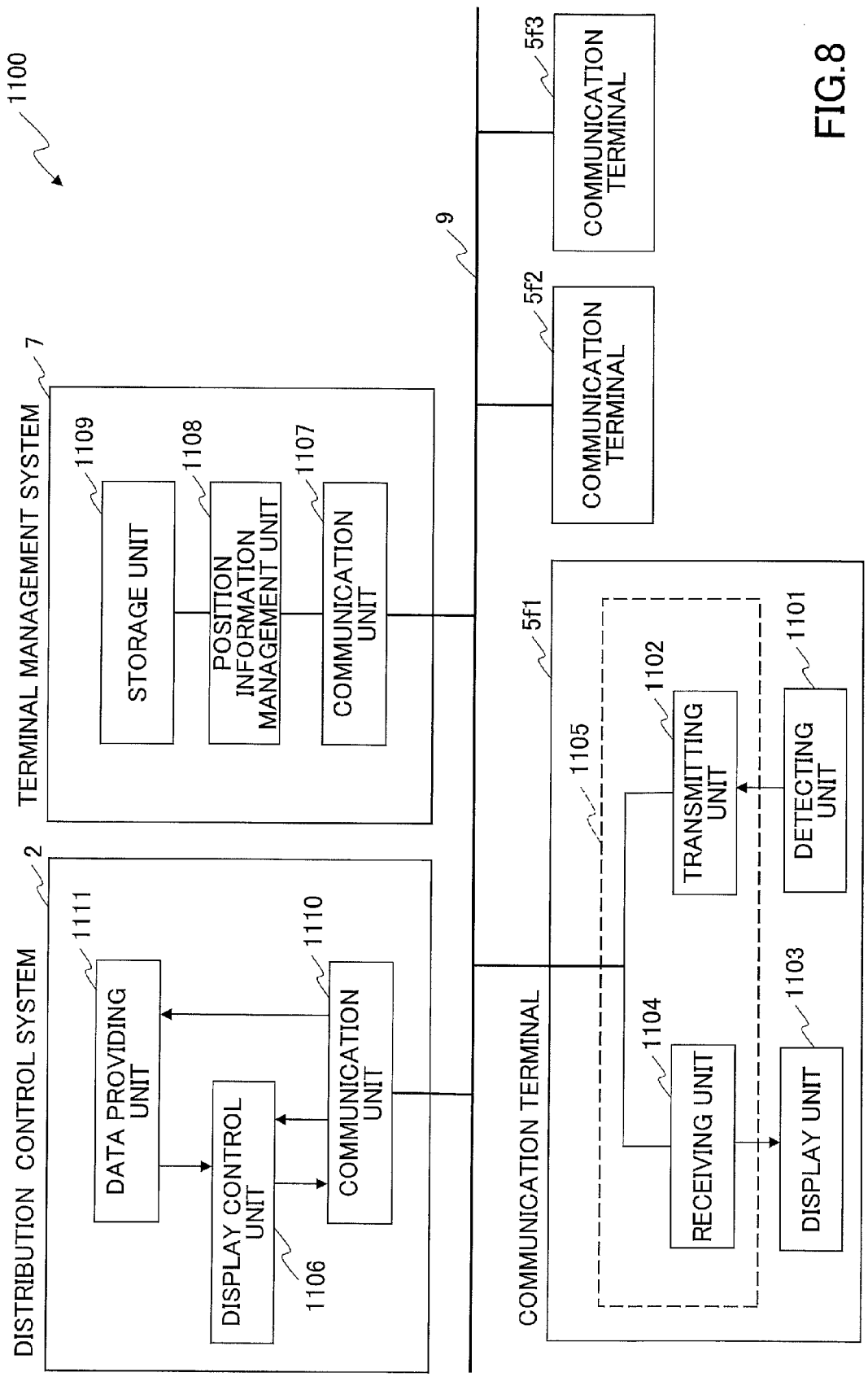
FIG. 8 generally illustrates a functional configuration of a display system according to the embodiment.

FIG. 8 generally illustrates a functional configuration of a display system 1100 according to the embodiment. The display system 1100 includes the plurality of communication terminals 5/1, 5/2 and 5/3, the distribution control system 2 and the terminal management system 7 each connected with the communication network 9. Note that the specific number of the communication terminals 5 illustrated in FIG. 8 is an example, and can be another number. Further, each of the communication terminals 5/2 and 5/3 has the same configuration as the communication terminal 5/1.

(Communication Terminal)

The communication terminal 5/1 includes a detecting unit 1101, a transmitting unit 1102, a receiving unit 1104 and a display unit 1103. The detecting unit 1101 detects the relative positions of the other communication terminals 5/2, 5/3 and/or the like when the other communication terminals 5/2, 5/3 and/or the like are installed adjacently (i.e., side by side, or so). The detecting unit 1101 includes, for example, the position detecting unit 814 of FIG. 5 and/or the like.

When the three communication terminal 5/1, 5/2 and 5/3 are installed, for example, side by side, in the stated order from the left side in sequence, the detecting unit 1101 of communication terminal 5/1 detects that the communication terminal 5/2 is installed on the right side of the communication terminal 5/1. Also, the detecting unit 1101 of communication terminal 5/2 detects that the communication terminal 5/1 is installed on the left side of the communication terminal 5/2 and the communication terminal 5/3 is installed on the right side of the communication terminal 5/2. Further, the detecting unit 1101 of communication terminal 5/3 detects that the communication terminal 5/2 is installed on the left side of the communication terminal 5/3.

Similarly, when the three communication terminal 5/1, 5/2 and 5/3 are installed vertically in sequence in the stated order from the top, the detecting unit 1101 of communication terminal 5/1 detects that the communication terminal 5/2 is installed below the communication terminal 5/1. Also, the detecting unit 1101 of communication terminal 5/2 detects that the communication terminal 5/1 is installed above the communication terminal 5/2 and the communication terminal 5/3 is installed below the communication terminal 5/2. Further, the detecting unit 1101 of communication terminal 5/3 detects that the communication terminal 5/2 is installed above the communication terminal 5/3.

The communication terminal 5/1 transmits terminal position information including information indicating the relative position detected by the detecting unit 1101 to the terminal management system 7 via the transmitting unit 1102.

The display unit 1103 of the communication terminal 5/1 acquires, via the receiving unit 1104, image data distributed by the distribution control system 2 based on the terminal position information of the communication terminal 5/1 transmitted to the terminal management system 7 and displays the image data on, for example, the display unit 804 of FIG. 5 or so. Note that the transmitting unit 1102 and the receiving unit 1104 of FIG. 8 can be integrated into a single unit (a transmitter/receiver 1105).

(Terminal Management System)

The terminal management system 7 includes a communication unit 1107, a position information management unit 1108 and a storage unit 1109. The position information management unit 1108 stores the respective sets of terminal position information of the plurality of communication terminals 5/1-5/3 acquired from the plurality of communication terminals 5/1-5/3 via the communication unit 1107 in the storage unit 1109. The position information management unit 1108 determines the positional relationship of the plurality of communication terminals 5/1-5/3 based on the thus acquired respective sets of terminal position information of the plurality of communication terminals 5/1-5/3.

For example, it is assumed that the display system 1100 includes the three communication terminals 5/1-5/3 and the three communication terminal 5/1, 5/2 and 5/3 are installed, side by side, in sequence, from the left side in the stated order. In this case, as described above, the communication terminal 5/1 sends the terminal position information indicating that the communication terminal 5/2 is installed on the right. Similarly, the communication terminal 5/2 sends the terminal position information indicating that the communication terminal 5/1 is installed on the left and the communication terminal 5/3 is installed on the right. Further, the communication terminal 5/3 sends the terminal position information indicating that the communication terminal 5/2 is installed on the left.

The position information management unit 1108 uses the respective sets of terminal position information thus sent from the three communication terminals 5/1-5/3 and determines that the three communication terminals 5/1-5/3 are installed, side by side, in sequence from the left in the stated order. Also, the position information management unit 1108 can have a function of requesting, if necessary, the plurality of communication terminals 5/1-5/3 to detect and transmit such position information.

(Distribution Control System)

The distribution control system 2 includes a communication unit 1110, a data providing unit 1111 and a display control unit 1106. The data providing unit 1111 corresponds to, for example, the browser 20 of FIG. 4 or so, and provides predetermined image data (given image) to be displayed on the communication terminals 5/1-5/3.

The display control unit 1106 acquires information indicating the positional relationship between the plurality of communication terminals 5/1-5/3 from the terminal management system 7 or so, and determines and generates image data to be displayed on the plurality of communication terminals 5/1-5/3 based on the acquired positional relationship. For example, with the configuration of "multidisplay" described above using FIG. 4, a given image is divided into three divisions and images to be displayed on the respective communication terminals are generated in such a manner that the plurality of communication terminals 5/1-5/3 display the given image in a "cooperation manner". The image data thus generated by the display control unit 1106 is transmitted to the communication terminals 5/1-5/3, respectively, via the communication unit 1110.

In the above-mentioned configuration of the display system 1100, the plurality of communication terminals 5/1-5/3 detect the position information concerning the adjacent communication terminals, respectively, and transmit the detected position information to the terminal management system 7.

The terminal management system 7 determines the positional relationship between the plurality of communication terminals 5/1-5/3 based on the respective sets of position information received from the plurality of communication terminals 5/1-5/3. The terminal management system 7 determines information for the distribution control system 2 to determine "respective sets of image data" to be displayed on the plurality of communication terminals 5/1-5/3 (i.e., information indicating the positional relationship of the plurality of communication terminals 5/1-5/3).

The distribution control system 2 generates the "respective sets of image data" to be displayed on the plurality of communication terminals 5/1-5/3 based on the information indicating the positional relationship of the plurality of communication terminals 5/1-5/3 determined by the terminal management system 7 and distributes the generated sets of image data to the plurality of communication terminals 5/1-5/3, respectively.

Thus, the display system 1100 can determine the positional relationship of the plurality of communication terminals 5/1-5/3 and easily display a given image on the plurality of communication terminals 5/1-5/3 in a "cooperation manner". For example, in the display system 1100, in response to a change of an arrangement, such as newly arranging the plurality of communication terminals 5/1-5/3 adjacently, breaking the adjacent arrangement thereof, changing the adjacent arrangement of the communication terminal 5/1-5/3, or so, respective images or image parts/divisions to be displayed on the plurality of communication terminals 5/1-5/3 are automatically generated accordingly, are then distributed, and thus, are actually displayed on the plurality of communication terminals 5/1-5/3, respectively.

Next, the distribution control system 2, the communication terminal 5 and the terminal management system 7 will be described in more detail.

(Functional Block Diagram)

Figure 9:
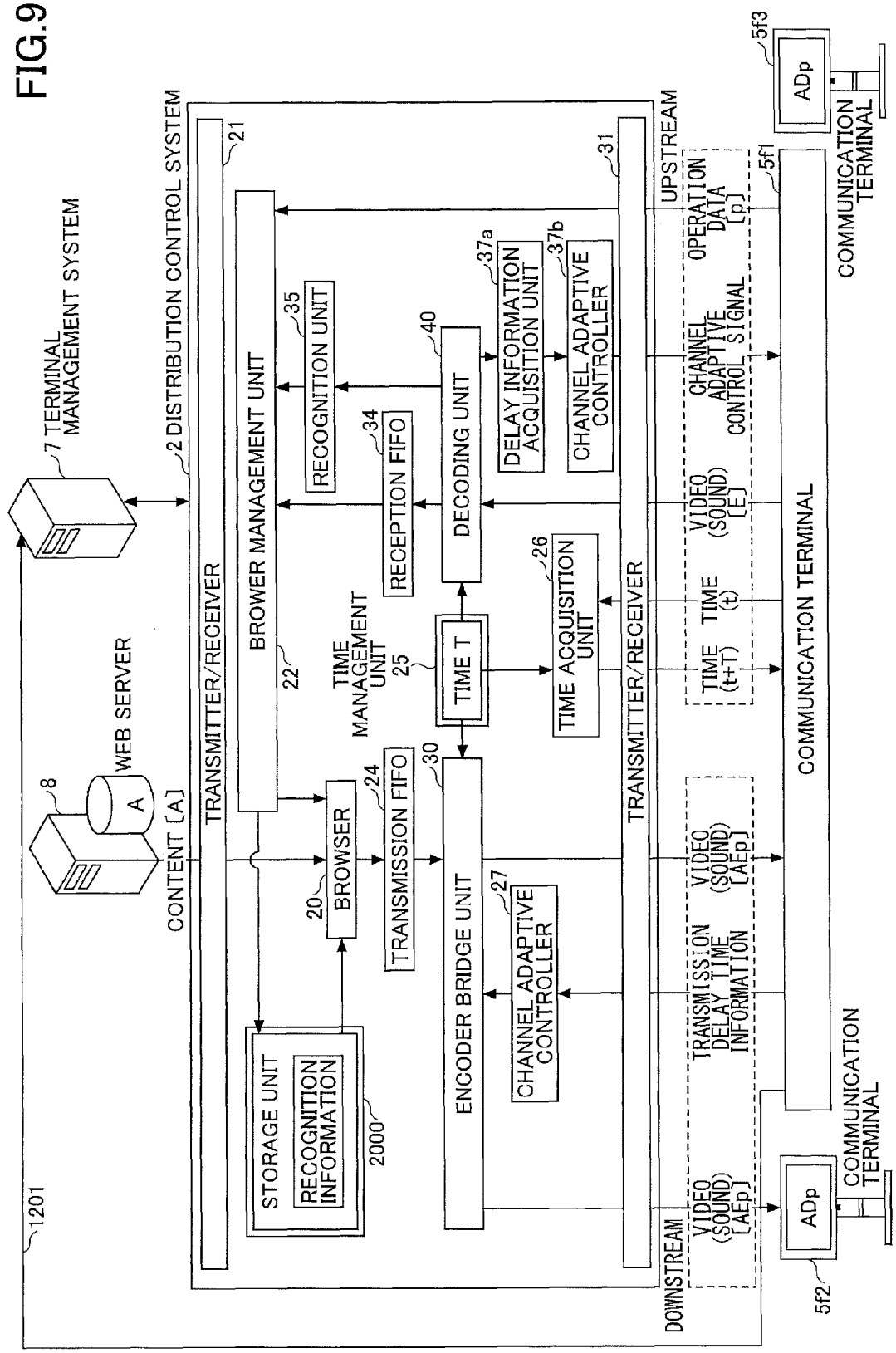
FIG. 9 is a functional block diagram of a distribution control system and so forth according to the embodiment.

FIG. 9 is a functional block diagram of the distribution control system 2 and so forth according to the embodiment. In FIG. 9, a functional configuration for distributing video (sound) data from the distribution control system 2 to the communication terminal 5/1 is illustrated. However, the same functional configuration is used also when the distribution destination is other than the communication terminal 5/1. Note that although the distribution control system 2 includes a plurality of distribution engine servers, a case will now be described where a single distribution engine server is included for simplifying the explanation.

(Functional Configuration of Distribution Control System)

As illustrated in FIG. 9, the distribution control system 2 has various functional configurations illustrated in FIG. 9 as a result of the hardware configuration including the CPU 201 and so forth illustrated in FIG. 6 executing a program(s).

Specifically, the distribution control system 2 has a browser 20, a transmitter/receiver 21, a browser management unit 22, a transmission FIFO 24, a time management unit 25, a time acquisition unit 26, a channel adaptive controller 27, an encoder bridge unit 30, a transmitter/receiver 31, a reception FIFO 34, a recognition unit 35, a delay information acquisition unit 37a, a channel adaptive controller 37b and a decoding unit 40. Further, the distribution control system 2 includes a storage unit 2000 provided by the HDD 204 illustrated in FIG. 9. The storage unit 2000 stores recognition information described later which is output from the recognition unit 35 via the browser management unit 22. Note that content data acquired by the browser 20 can be temporarily stored in the storage unit 2000 as a cache.

Among the above-mentioned functional elements, the browser 20 is a Web browser that operates in the distribution control system 2. The browser 20 is always updated along with enrichment of Web content. The browser 20 includes, for example, Media Player, Flash Player, JavaScript (registered trademark), CSS and HTML renderer. JavaScript includes the standardized product and one unique to the distribution system 1.

The Media Player is a browser plug-in for reproducing multimedia files such as video (sound) files in the browser 20. The Flash Player is a browser plug-in for reproducing flash content in the browser 20. The unique JavaScript is a JavaScript group that provides an application programming interface (API) of services unique to the distribution system 1. The CSS is a technology for efficiently defining the appearance and style of web pages described in HTML. The HTML Renderer is an HTML rendering engine.

The renderer renders content data such as web content data as image (sound) data, thereby generating pieces of frame data as pieces of still image (sound) data. Further, the renderer is also a layout engine that performs the layout of a plurality of kinds of content.

The distribution system 1 according to the present embodiment provides a plurality of browsers 20 in the distribution control system 2, and a cloud browser for use in a user session is selected from the browsers 20. Described below continuously is a case of providing the single browser 20 in order to simplify the description.

The transmitter/receiver 21 transmits and receives various kinds of data, various kinds of requests, various kinds of instructions and the like to and from the terminal management system 7 and the web server 8. For example, the transmitter/receiver 21 acquires web content data from a content site of the web server 8. The transmitter/receiver 21 outputs the various kinds of data acquired from the terminal management system 7 to the functional components within the distribution control system 2 and controls the functional components within the distribution control system 2 based on the various kinds of data, various kinds of requests, various kinds of instructions and the like acquired from the terminal management system 7. For example, for the browsers 20, the transmitter/receiver 21 outputs a request for switching distribution patterns from the terminal management system 7 to the browser management unit 22, and the browser management unit 22 controls switching from one browser to another browser among the browsers 20. Based on the request for switching distribution from the terminal management system 7, the transmitter/receiver 21 performs the switching of combinations of the components within the encoder bridge unit 30 illustrated in FIG. 10 and FIG. 11.

The browser management unit 22 manages the browser 20. For example, the browser management unit 22 instructs the browser 20 to start up and exit and numbers (assigns) an encoder ID at startup or exit. The encoder ID is identification information the browser management unit 22 numbers in order to manage the process of the encoder bridge unit 30.

The browser management unit 22 numbers and manages a browser ID every time the browser 20 is started up. The browser ID is identification information the browser management unit 22 numbers in order to manage the process of the browser 20 to identify the browser 20.

The browser management unit 22 acquires terminal position information that indicates positional relationship of a plurality of communication terminals 5/1-5/3 from the terminal management system 7 via the transmitter/receiver 21. The browser management unit 22 transmits an instruction to carry out a process of changing, dividing, integrating or so of information that is read into the browser 20 depending on acquired terminal position information according to a predetermined rule or instruction to the encoder bridge unit 30. Note that the browser management unit 22 and the encoder bridge unit 30 are included, for example, in the display control unit 1106 of FIG. 8.

The browser management unit 22 acquires various kinds of operation data from a communication terminal 5 through the transmitter/receiver 31 and outputs them to the browser 20. The operation data is data occurring through operation events (operations through the keyboard 211, the mouse 212, and the like, strokes with the electronic pen P, and the like) on the communication terminal 5. When the communication terminal 5 provides various sensors such as a temperature sensor, a humidity sensor, an acceleration sensor and/or the like, the browser management unit 22 acquires sensor information that is output signals of the sensors from the communication terminal 5 and outputs them to the browser 20. The browser management unit 22 further acquires image (sound) data from the recognition unit 35 and outputs it to the browser 20 and acquires recognition information described below from the recognition unit 35 and stores it in the storage unit 2000. The browser management unit 22 acquires video (sound) data from the reception FIFO 34 and outputs it to the browser 20.

The transmission FIFO 24 is a buffer that stores therein pieces of frame data as pieces of still image (sound) data generated by the browser 20.

The time management unit 25 manages time T unique to the distribution control system 2.

The time acquisition unit 26 performs a time adjustment process in cooperation with a time controller 56 in a communication terminal 5 described below. Specifically, the time acquisition unit 26 acquires time information (T) indicating time T in the distribution control system 2 from the time management unit 25, receives time information (t) indicating time t in the communication terminal 5 from the time controller 56 described below through the transmitter/receiver 31 and a transmitter/receiver 51, and transmits the time information (t) and the time information (T) to the time controller 56.

The channel adaptive controller 27 calculates reproduction delay time U based on transmission delay time information (D) and calculates operation conditions such as the frame rate and the data resolution of a converter 10 in the encoder bridge unit 30. This reproduction delay time is time for delaying reproduction through the buffering of data until being reproduced.

The encoder bridge unit 30 outputs pieces of frame data as pieces of still image (sound) data generated by the browser 20 to the converter 10 in the encoder bridge unit 30 described below. The encoder bridge unit 30 will be described in more detail with reference to FIG. 10 and FIG. 11.

Figure 10:
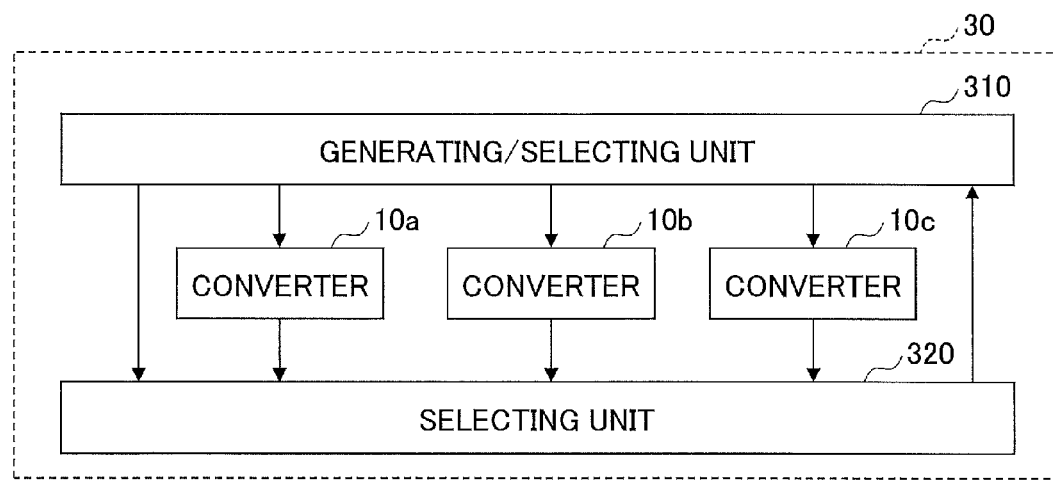
FIG. 10 is a detailed view of an encoder block according to the embodiment.
Figure 11:
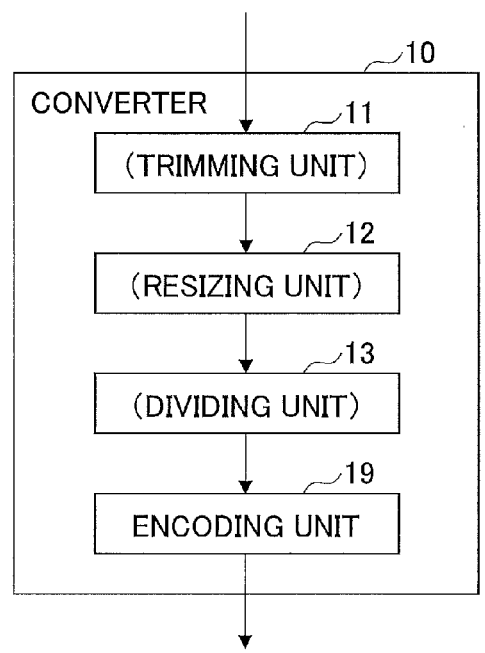
FIG. 11 is a functional block diagram illustrating respective functions of a conversion unit according to the embodiment.

FIG. 10 is a detailed diagram of the encoder bridge unit 30. FIG. 11 is a functional block diagram illustrating the functions of the converter.

As illustrated in FIG. 10, the encoder bridge unit 30 includes a generating/selecting unit 310, a selecting unit 320 and a plurality of converters (10a, 10b, 10c) provided therebetween. Although the three converters are illustrated here, any number of them may be provided. In the following, any converter is represented as a "converter 10".

The converter 10 converts the data format of pieces of frame data as pieces of still image (sound) data generated by the browser 20 into a data format of H.264 or the like capable of being distributed to communication terminals 5 through the communication network 9. For that purpose, as illustrated in FIG. 11, the converter 10 includes a trimming unit 11, a resizing unit 12, a dividing unit 13 and the encoding unit 19. The trimming unit 11, the resizing unit 12 and the dividing unit 13 do not perform any process on sound data.

The trimming unit 11 performs a process to cut out only part of a still image. The resizing unit 12 changes the reduced scale of a still image. The dividing unit 13 divides a still image as illustrated in FIG. 4.

The encoding unit 19 encodes pieces of frame data as pieces of still image (sound) data generated by the browser 20, thereby converting them so that video (sound) data can be distributed to communication terminals 5 through the communication network 9. When the video is not in motion (when there is no inter-frame change), a skip frame is thereafter inserted until the video moves to save band width.

When sound data is generated together with still image data by rendering, these pieces of data are encoded, and when only sound data is generated, only encoding is performed, without performing trimming, resizing and dividing, causing data to be compressed.

The generating/selecting unit 310 generates a new converter 10 and selects pieces of frame data as pieces of still image (sound) data to be input to a converter 10 that is already generated. In generating it, the generating/selecting unit 310 generates a converter 10 allowing conversion according to the reproduction capability of video (sound) data in a communication terminal 5. In selecting it, a converter 10 that is already generated is selected. For example, in starting distribution to the communication terminal 5b in addition to distribution to the communication terminal 5a, the same video (sound) data as video (sound) data being distributed to the communication terminal 5a may be distributed to the communication terminal 5b. In such a case, furthermore, when the communication terminal 5b has the same reproduction capability as the reproduction capability of video (sound) data of the communication terminal 5a, the generating/selecting unit 310, without generating a new converter 10b for the communication terminal 5b, utilizes the converter 10a that is already generated for the communication terminal 5a.

The selecting unit 320 selects a desired one from the converters 10 that are already generated. The selection by the generating/selecting unit 310 and the selecting unit 320 can perform distribution of various patterns.

Returning to FIG. 9, the description of the distribution control system 2 will be continued. The transmitter/receiver 31 transmits and receives various data, requests and the like to and from communication terminals 5. This transmitter/receiver 31 transmits various data requests, and the like to the communication terminals 5 through the communication network 9 from the cloud, thereby allowing the distribution control system 2 to distribute various data, requests, and the like to the communication terminals 5. For example, in a login process of a communication terminal 5, the transmitter/receiver 31 transmits, to the transmitter/receiver 51 of the communication terminal 5, authentication screen data for prompting a user a login request. The transmitter/receiver 31 also performs data transmission and data reception to and from user applications of the communication terminal 5 and device applications of the communication terminal 5 by a protocol unique to the distribution system 1 through a Hypertext Transfer Protocol over Secure Socket Layer (HTTPS) server. This unique protocol is an HTTPS-based application layer protocol for transmitting and receiving data in real time and without being interrupted between the distribution control system 2 and the communication terminal 5. The transmitter/receiver 31 also performs transmission response control, real-time data generation, command transmission, reception response control, reception data analysis and gesture conversion.

Among these, the transmission response control is a process to manage an HTTPS session for downloading requested from the communication terminal 5 in order to transmit data from the distribution control system 2 to the communication terminal 5. The response of the HTTPS session for downloading does not end immediately and holds for a certain period of time (one to a few minutes). The transmitter/receiver 31 dynamically writes data to be sent to the communication terminal 5 in the Body part of the response. In order to eliminate costs for reconnection, another request from the communication terminal 5 is allowed before the previous session ends. By putting the transmitter/receiver 31 on standby until the previous request is completed, overhead can be eliminated even when reconnection is performed.

The real-time data generation is a process to give a unique header to the data of compressed video (and a compressed sound) generated by the encoding unit 19 in FIG. 11 and write it in the Body part of HTTPS.

The command transmission is a process to generate command data to be transmitted to the communication terminal 5 and write it in the Body part of HTTPS directed to the communication terminal 5.

The reception response control is a process to manage an HTTPS session requested from the communication terminal 5 in order for the distribution control system 2 to receive data from the communication terminal 5. The response of this HTTPS session does not end immediately and is held for a certain period of time (one to a few minutes). The communication terminal 5 dynamically writes data to be sent to the transmitter/receiver 31 of the distribution control system 2 in the Body part of the request.

The reception data analysis is a process to analyze the data transmitted from the communication terminal 5 by type and deliver the data to a necessary process.

The gesture conversion is a process to convert a gesture event input to the communication terminal 5f as the electronic blackboard by a user with an electronic pen or in handwriting into data of a format capable of being received by the browser 20.

The reception FIFO 34 is a buffer that stores therein video (sound) data after being decoded by the decoding unit 40.

The recognition unit 35 performs a process on image (sound) data received from the communication terminal 5. Specifically, for example, the recognition unit 35 recognizes the face, age, gender, and the like of men or animals based on images taken by a camera 62 for signage. For offices, the recognition unit 35 performs name tagging by face recognition and a process of replacing a background image based on images taken by the camera 62. The recognition unit 35 stores recognition information indicating the recognized details in the storage unit 2000. The recognition unit 35 achieves speeding up by performing a process with a recognition expansion board.

The delay information acquisition unit 37a is used for a process of downstream channel adaptive control corresponding to a delay information acquisition unit 57 for use in a process of upstream channel adaptive control. Specifically, the delay information acquisition unit 37a acquires transmission delay time information (d1) indicating transmission delay time d1 from the decoding unit 40 and holds it for a certain period of time, and when a plurality of pieces of transmission delay time information (d1) are acquired, outputs to the channel adaptive controller 37b transmission delay time information (d) indicating frequency distribution information by a plurality of pieces of transmission delay time d1.

The channel adaptive controller 37b is used for a process of downstream channel adaptive control corresponding to the channel adaptive controller 27 for use in a process of the upstream channel adaptive control. Specifically, the channel adaptive controller 37b calculates operation conditions of the encoding unit 60 based on transmission delay time information (d). The channel adaptive controller 37b transmits a channel adaptive control signal indicating operation conditions such as a frame rate and data resolution to the encoding unit 60 of the communication terminal 5 through the transmitter/receiver 31 and the transmitter/receiver 51.

The decoding unit 40 decodes the video (sound) data transmitted from the communication terminal 5.

(Functional Configuration of Communication Terminal)

Described next is the functional configuration of each communication terminal 5. The communication terminal 5 is a terminal serving as an interface for a user to perform a login to the distribution system 1, start and stop the distribution of video (sound) data and the like. Note that communication terminals 5 are examples of display apparatuses.

Figure 12:
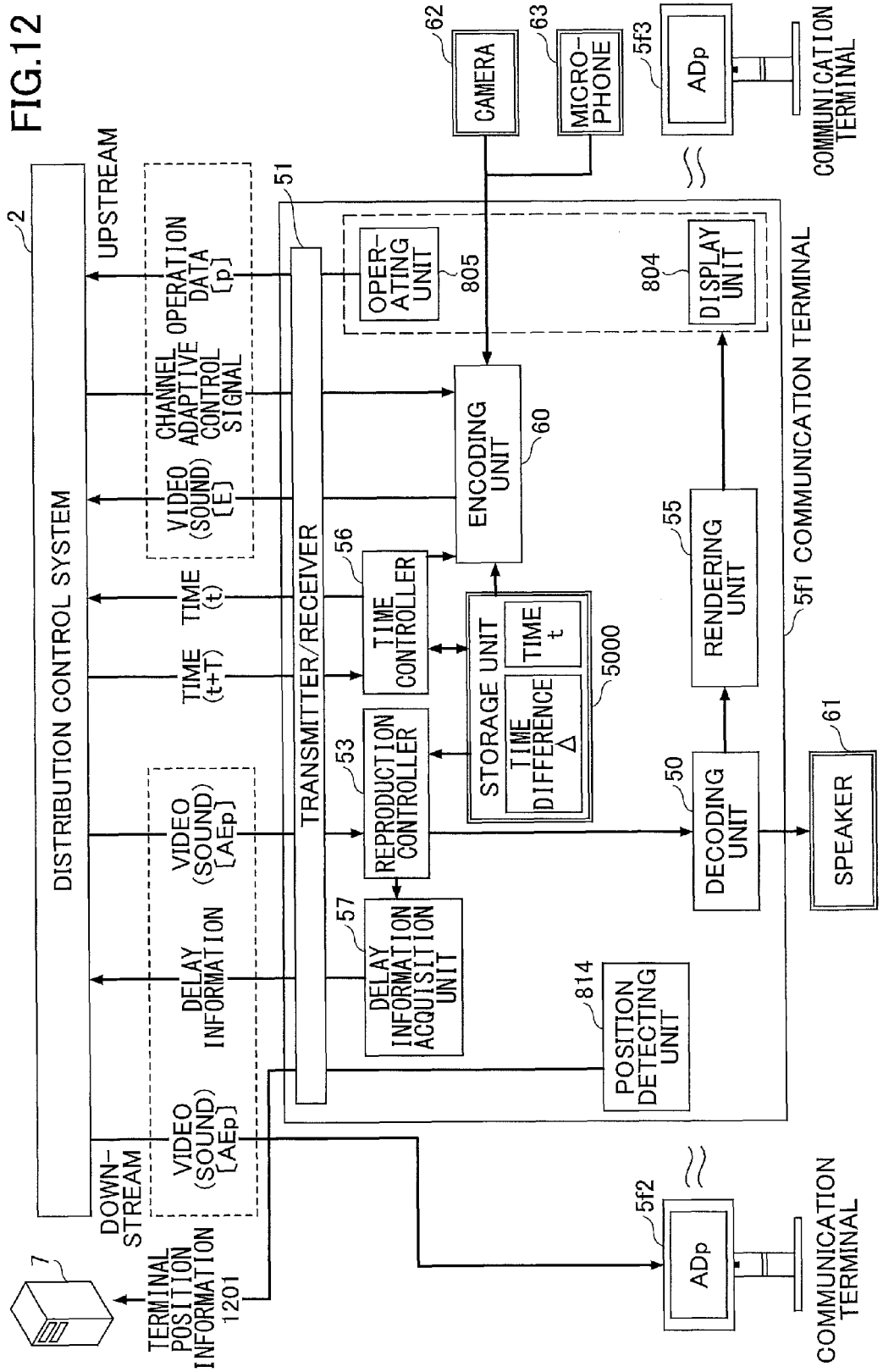
FIG. 12 is a functional block diagram of the communication terminal according to the embodiment.

FIG. 12 is a functional block diagram of the communication terminal 5 according to the embodiment. As illustrated in FIG. 12, the communication terminal 5 includes a decoding unit 50, a transmitter/receiver 51, an operating unit 805, a reproduction controller 53, a rendering unit 55, a time controller 56, a delay information acquisition unit 57, a display unit 58 and an encoding unit 60. The communication terminal 5 further includes a storage unit 5000 provided by the RAM 203 illustrated in FIG. 6. This storage unit 5000 stores therein time difference information ($\Delta$) indicating a time difference $\Delta$ described below and time information (t) indicating time "t" in the communication terminal 5.

Among these, the decoding unit 50 decodes video (sound) data distributed from the distribution control system 2 and output from the reproduction controller 53.

The transmitter/receiver 51 transmits and receives various data, requests and the like to and from the transmitter/receiver 31 of the distribution control system 2 and a transmitter/receiver 71a of the terminal management system 7. For example, in a login process of the communication terminal 5, the transmitter/receiver 51 sends a login request to the transmitter/receiver 71a of the terminal management system 7 based on a startup of the communication terminal 5 by the operating unit 805.

The operating unit 805 performs a process to receive operation input by a user, for example, receives input, selection or the like with a power switch, a keyboard, a mouse, an electronic pen P or the like, and transmits it as operation data to the browser management unit 22 of the distribution control system 2.

The reproduction controller 53 buffers the video (sound) data (a packet of real-time data) received from the transmitter/receiver 51 and outputs it to the decoding unit 50 considering reproduction delay time U.

The rendering unit 55 renders the data decoded by the decoding unit 50.

The time controller 56 performs a time adjustment process in cooperation with the time acquisition unit 26 of the distribution control system 2. Specifically, the time controller 56 acquires time information (t) indicating time t in the communication terminal 5 from the storage unit 5000. The time controller 56 issues a request for time information (T) indicating time T in the distribution control system 2 to the time acquisition unit 26 of the distribution control system 2 through the transmitter/receiver 51 and the transmitter/receiver 31. In this case, the time information (t) is transmitted concurrently with the request for the time information (T).

The delay information acquisition unit 57 acquires from the reproduction controller 53 transmission delay time information (D1) indicating transmission delay time D1 and holds it for a certain period of time, and when a plurality of pieces of transmission delay time information (D1) are acquired, outputs transmission delay time information (D) indicating frequency distribution information by the plurality of pieces of transmission delay time D1 to the channel adaptive controller 27 through the transmitter/receiver 51 and the transmitter/receiver 31. The transmission delay time information (D) is transmitted, for example, once in a hundred frames.

The display unit 58 reproduces the data rendered by the rendering unit 55.

The encoding unit 60 transmits video (sound) data [E] that is acquired from a built-in microphone 213 or a camera 62 and a microphone 63, which are externally attached, and is encoded, time information ($t_0$) indicating the current time $t_0$ in the communication terminal 5 acquired from the storage unit 5000, the time difference information ($\Delta$) indicating the time difference $\Delta$ acquired from the storage unit 5000 to the decoding unit 40 of the distribution control system 2 through the transmitter/receiver 51 and the transmitter/receiver 31. The encoding unit 60 changes the operation conditions of the encoding unit 60 based on the operation conditions indicated by the channel adaptive control signal received from the channel adaptive controller 37b. The encoding unit 60, in accordance with the new operation conditions, transmits the video (sound) data [E] that is acquired from the camera 62 and the microphone 63 and is encoded, the time information ($t_0$) indicating the current time $t_0$ in the communication terminal 5 acquired from the storage unit 5000, and the time difference information ($\Delta$) indicating the time difference $\Delta$ acquired from the storage unit 5000 to the decoding unit 40 of the distribution control system 2 through the transmitter/receiver 51 and the transmitter/receiver 31.

The built-in microphone 812, the externally attached camera 62 and the microphone 63, and the like are examples of an inputting unit and are devices that need encoding and decoding. The inputting unit can output touch data and smell data in addition to video (sound) data.

The inputting unit includes various sensors such as a temperature sensor, a direction sensor, an acceleration sensor and/or the like.

The position detecting unit 814 acquires terminal position information including information indicating the position of another communication terminal 5. Further, the position detecting unit 814 transmits thus acquired position information (terminal position information 1201) to the terminal management system 7 via the transmitter/receiver 51.

Figure 13:
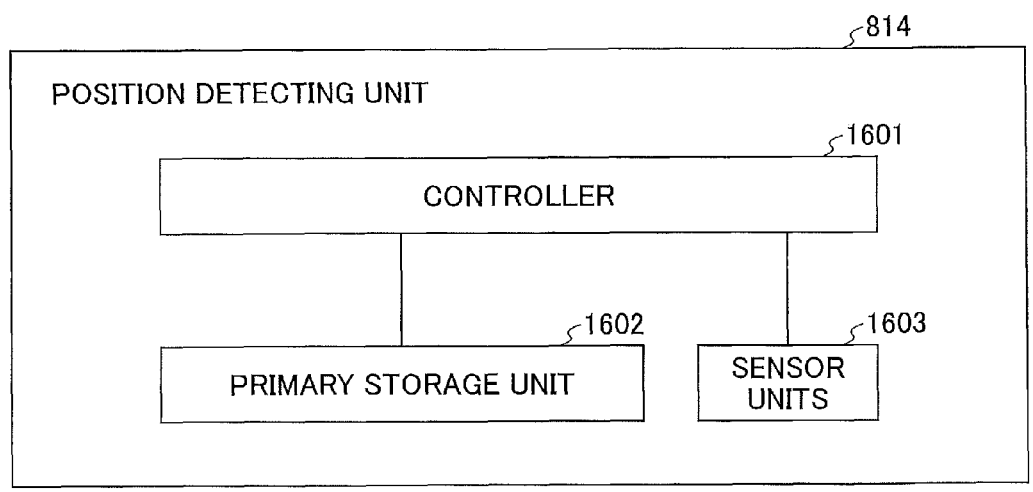
FIG. 13 is a block diagram of a position detecting unit according to the embodiment.

FIG. 13 is a block diagram of the position detecting unit 814 according to the embodiment. The position detecting unit 814 includes a controller 1601, a primary storage unit 1602 and sensor units 1603. The controller 1601 controls the position detecting unit 814 and is implemented by, for example, a program executed by the CPU 801 of FIG. 5. The primary storage unit 1602 stores information acquired by the sensor units 1603 and is included in, for example, the RAM 803 or the storage unit 806 of FIG. 5, or the like. The sensor units 1603 are installed at a plurality of sides (for example, 4 sides) of the display unit 804 of FIG. 5 and detect the position information of another communication terminal 5/2 adjacently placed.

By the above-mentioned configuration, the controller 1601 acquires the position information of another communication terminal(s) 5, for example, at predetermined time intervals (for example, every second), and stores thus acquired position information of the other communication terminal(s) 5 in the primary storage unit 1602. The controller 1601 responds to, for example, a request from the terminal management system 7, or at predetermined time intervals, transmits the position information stored in the primary storage unit 1602 to the terminal management system 7 via the transmitter/receiver 51. Note that specific configurations of the sensor units 1603 will be described later.

(Configuration Terminal Position Information)

Figure 14:
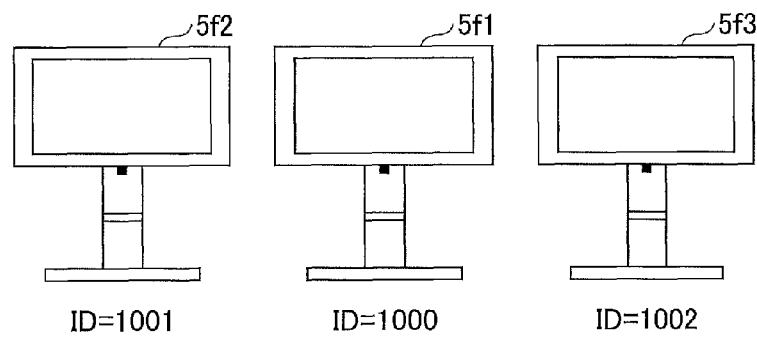
FIG. 14 illustrates one example of an arrangement of communication terminals according to the embodiment.

A configuration of "terminal position information" thus detected by the position detecting unit 814 will now be described. For example, a case will be assumed where three communication terminals 5/1, 5/2 and 5/3 are installed, side by side, as illustrated in FIG. 14. It is also assumed that the communication terminals 5/1, 5/2 and 5/3 have unique identification information (IDs), "1000", "1001" and "1002", given thereto, respectively. The unique IDs, for example, IDs unique to respective communication terminals 5, such as a MAC address of the communication I/F unit 810 of FIG. 5, are electronically written inside, and are readable. The position detecting unit 814 of the communication terminal 5/1 detects, as terminal position information, the positions, the distances, the IDs and/or the like of the other communication terminals 5/2 and 5/3, placed on both sides or above and below the communication terminal 5/1.

FIG. 15 illustrates one example of "terminal position information" 1800 according to the embodiment. FIG. 15 illustrates one example of "position information" detected by the communication terminal 5/1 of FIG. 14.

In FIG. 15, "MyDev" in the column of "data label" 1801 denotes the own apparatus, i.e., the communication terminals 5/1. "LeftDev" in the column of "data label" 1801 denotes the communication terminals 5/2 placed on the left side of the own apparatus 5/1. "RightDev" in the column of "data label" 1801 denotes the communication terminals 5/3 placed on the right side of the own apparatus 5/1. Similarly, "UpperDev" and "LowerDev" denote communication terminals 5 (not illustrated in FIG. 14) placed in the upward direction (above) and in the downward direction (below), respectively.

The column of "ID" 1802 of FIG. 15 denotes the IDs of the communication terminals indicated in the column of "data label" 1801, respectively. In the example of the arrangement of FIG. 14, the communication terminal 5/2 having the ID "1001" is placed on the left side of the communication terminal 5/1. Therefore, "1001" is written on the line of "LeftDev" in the column "ID" 1802. Similarly, on the line of "RightDev", the terminal ID "1002" of the communication terminals 5/3 is written in the column of "ID" 1802. Further, in the example of FIG. 14, no communication terminals are placed above (in the upward direction of) or below (in the downward direction of) the communication terminal 5/1. Therefore, in this case, on each of the lines of "UpperDev" and "LowerDev", "Null" is written in the column of "ID" 1802 indicating that no communication terminal is placed. Thus, information in the columns of "data label" 1801 and "ID" 1802 indicates the positions (directions) of the other communication terminals such as those 5/2 and 5/3 with respect to the communication terminal 5/1 ("MyDev").

The column "distance" 1803 in FIG. 15 denotes the distances between the own apparatus 5/1 ("MyDev") and the communication terminals 5/2 and 5/3 indicated in the column "data label" 1801, respectively. The example of FIG. 15 indicates that the distance between the communication terminal 5/1 ("MyDev") having "1000" of "ID" 1802 and the communication terminal 5/2 ("LeftDev") on the left adjacent side having "1001" of "ID" 1802 is "1000". Similarly, the example of FIG. 15 indicates that the distance between the communication terminal 5/1 ("MyDev") having "1000" of "ID" 1802 and the communication terminal 5/3 ("RightDev") on the right adjacent side having "1002" of "ID" 1802 is "0". Note that any unit can be used as the unit of the distance depending on a request of the system and/or the like.

Since no communication terminal is placed in each of the upward direction or in the downward direction of the communication terminal 5/1, "Null" is written in each of the lines of "UpperDev" and "LowerDev" in the column "distance" 1803 indicating that no communication terminal is placed. Thus, the information in the column "distance" 1803 indicates the positions (distances) of the other communication terminals 5 with respect to the communication terminal 5/1 ("MyDev").

Thus, each of the communication terminals 5/1-5/3 stores information concerning the identification information (ID) of the other communication terminals 5 placed above, below, on the left side and/or on the right side of the own apparatus and the distances between the other communication terminals and the own apparatus, as data having a table configuration, for example, as illustrated in FIG. 15 ("terminal position information"). The respective communication terminals 5/1-5/3 transmit the thus stored terminal position information to the predetermined terminal management system 7 via the transmitter/receiver 51.

(Functional Configuration of Terminal Management System)

Figure 16:
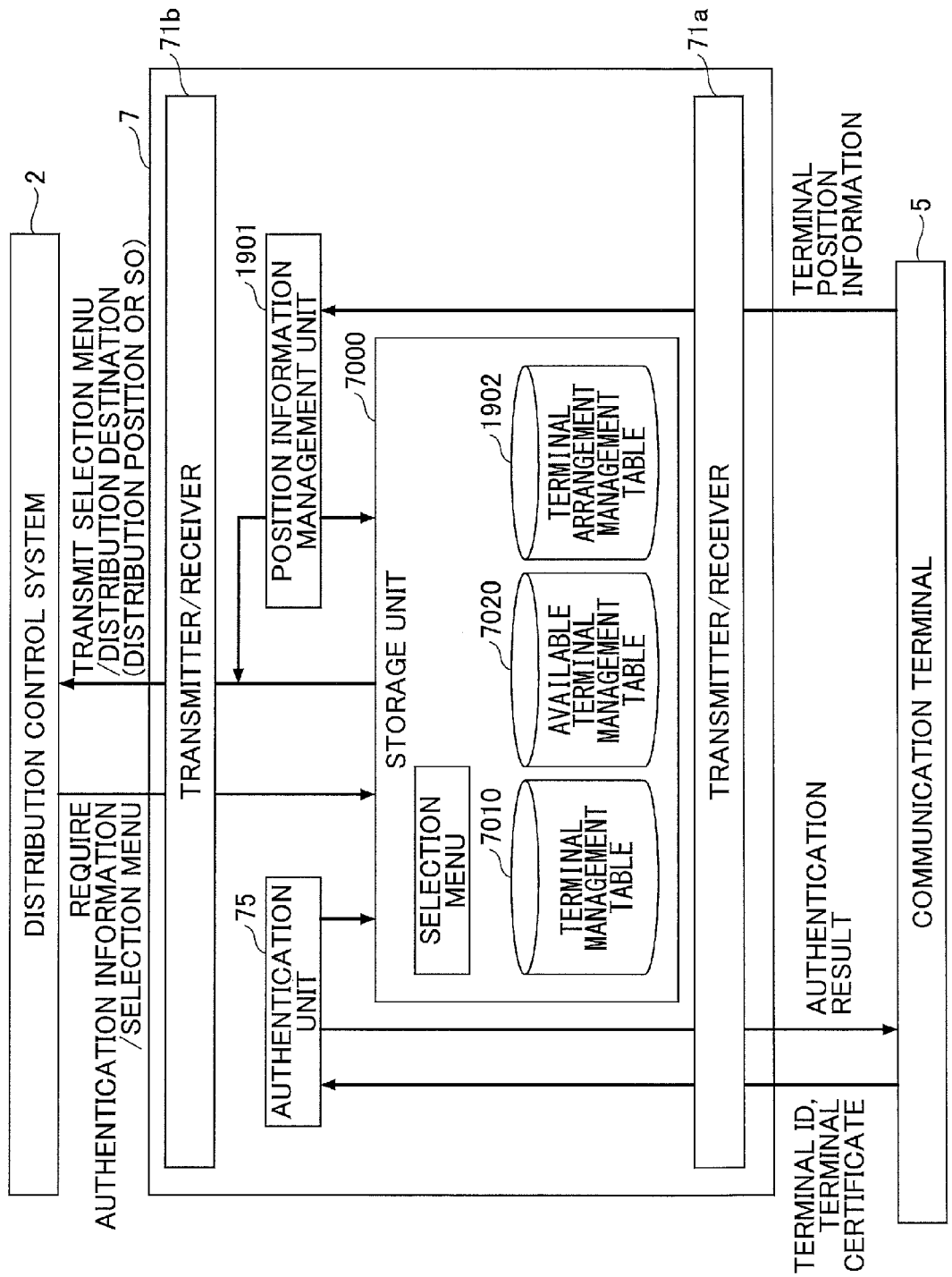
FIG. 16 is a functional block diagram of the terminal management system according to the embodiment.

Described next with reference to FIG. 16 is the functional configuration of the terminal management system 7. FIG. 16 is a functional block diagram illustrating the functions of the terminal management system.

As illustrated in FIG. 16, the terminal management system 7 includes transmitter/receiver 71a, a transmitter/receiver 71b, an authentication unit 75 and a position management unit 1901. The terminal management system 7 further includes a storage unit 7000 provided by the HDD 204 illustrated in FIG. 6. The storage unit 7000 stores therein distribution destination selection menu data, a terminal management table 7010, and an available terminal management table 7020.

Among these, the distribution destination selection menu is data indicating such a destination selection menu screen as illustrated in FIG. 17.

As illustrated in FIG. 18, the terminal management table 7010 manages the terminal IDs of communication terminals 5, user certificates, contract information for users to use the services of the distribution system 1, the terminal types of the communication terminals 5, setting information indicating the home uniform resource locators (URLs) of the respective communication terminals 5, the execution environment information of the respective communication terminals 5, shared IDs, installation position information, and display name information in association with each other. Among these, the execution environment information includes "favorites", "previous Cookie information", and "cache files" of the respective communication terminals 5, which are sent to the distribution control system 2 together with the setting information after the login of the communication terminals 5 and are used for performing individual services on the respective communication terminals 5.

The shared ID is an ID that is used when each user distributes the same video (sound) data as video (sound) data being distributed to his/her own communication terminal 5 to another communication terminal 5, thereby performing a remote sharing process and is identification information that identifies the other communication terminal and the other communication terminal group. For example, the shared ID of the terminal ID "t006" is "v006", the shared ID of the terminal ID "t007" is "v006", and the shared ID of the terminal ID "t008" is "v006". When a request for a remote sharing process with the communication terminals (5/1, 5/2 and 5/3) with the terminal ID "v006" is issued from the communication terminal 5a with the terminal ID "t001", the distribution control system 2 distributes the same video (sound) data as video (sound) data being distributed to the communication terminals 5a to the communication terminals (5/1, 5/2 and 5/3). However, when the communication terminal 5a and the communication terminals (5/1, 5/2 and 5/3) are different in the resolution of the display units 58, the distribution control system 2 distributes the video (sound) data according to the different resolution(s).

The installation position information indicated in FIG. 18 indicates the installation positions when the communication terminals (5/1, 5/2 and 5/3) are arranged, side by side, as illustrated in FIG. 4, for example. The display name information is information indicating the display names to be displayed in the distribution destination selection menu as illustrated in FIG. 17.

The available terminal management table 7020 manages, in association with each terminal ID, the shared ID indicating a communication terminal 5 or a communication terminal group with which the communication terminal 5 indicated by the terminal ID can perform the remote sharing process.

FIG. 20 illustrates one example of the terminal arrangement management table 1902. The terminal arrangement management table 1902 stores "terminal ID" 2301, "data label" 2302, "ID" 2303, "distance" 2304, "arranged position" 2305 and so forth.

Described next are the functions of the respective units. The transmitter/receiver 71a transmits and receives various data, requests, and the like to and from the communication terminal 5. For example, the transmitter/receiver 71a receives a login request from the transmitter/receiver 51 of a communication terminal 5 and transmits an authentication result of the login request to the transmitter/receiver 51.

The transmitter/receiver 71b transmits and receives various data, requests, and the like to and from the distribution control system 2. For example, the transmitter/receiver 71b receives a request for the data of the distribution destination selection menu from the transmitter/receiver 21 of the distribution control system 2 and transmits the data of the distribution destination selection menu to the transmitter/receiver 21.

The authentication unit 75 searches the terminal management table 7010 based on the terminal ID and the user certificate received from a communication terminal 5, thereby determining whether there are any terminal ID and user certificate of the same combination, thereby authenticating the communication terminal 5.

When having received terminal position information from each communication terminal 5, the position information management unit 1901 records the respective sets of data corresponding to "data label" 2302, "ID" 2303 and "distance" 2304 in the terminal arrangement management table 1902 in association with "ID" 2301 of the communication terminal 5 which is the transmission source. Further, the position information management unit 1901 determines the positional relationship of the plurality of communication terminals 5/1-5/3 based on the received terminal position information and records the determined positional relationship in the column of "arranged position" 2305.

For example, it is possible to see that the communication terminal (5/2) having the terminal ID "1001" is placed on the left side of the communication terminal (5/1) having the terminal ID "1000" from the terminal arrangement management table 1902 illustrated in FIG. 20, for example. Further, it is possible to also see that the communication terminal (5/3) having the terminal ID "1002" is placed on the right side of the communication terminal (5/1) having the terminal ID "1000" from the terminal arrangement management table 1902 illustrated in FIG. 20. Further, it is possible to also see that no communication terminals are placed in the upward or downward direction of the communication terminal (5/1) having the terminal ID "1000" from the terminal arrangement management table 1902 illustrated in FIG. 20.

Similarly, it is possible to see that the communication terminal having the terminal ID "1000" is placed on the right side of the communication terminal having the terminal ID "1001" and no communication terminal is placed on the other side. Further, it is possible to see that the communication terminal having the terminal ID "1000" is placed on the left side of the communication terminal having the terminal ID "1002" and no communication terminal is placed on the other side.

Thus, the position information management unit 1901 can determine from the information recorded in the terminal arrangement management table 1902 that the communication terminals having the terminal IDs "1001", "1000" and "1002" are arranged, side by side, in sequence from the left in the stated order.

<Configuration of Sensor Unit>

Specific configurations of the sensor units 1603 of communication terminals 5 will be described now.

First Example

Figure 21C:
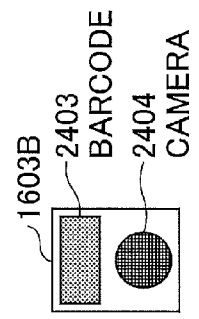
FIGS. 21A, 21B and 21C illustrate configuration examples of sensor units in a first example according to the embodiment.
Figure 21B:
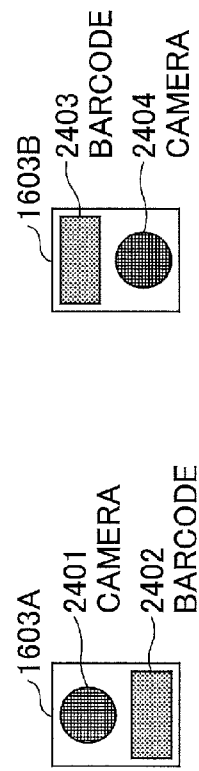
Figure 21A:
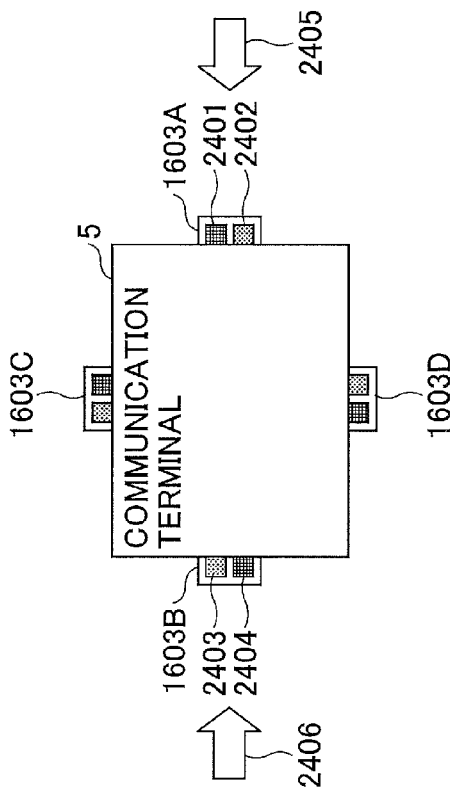

FIGS. 21A, 21B and 21C illustrate configuration examples of sensor units 1603 in a first example according to the embodiment. As illustrated in FIG. 21A, on the right side and the left side of a communication terminal 5, sensor units 1603A and 1603B in each of which a camera and a barcode are integrally included are mounted in such a manner that they have approximately the same heights. The objective lens of the camera 2401 and the barcode 2402 of the sensor unit 1603A are installed to face outward from the end face of the communication terminal 5. Similarly, the objective lens of the camera 2404 and the barcode 2403 of the sensor unit 1603B are installed to face outward from the end face of the communication terminal 5.

FIG. 21B is a view of the sensor unit 1603A viewed in the direction of the arrow 2405 of FIG. 21A. As illustrated, the sensor unit 1603A has the camera 2401 at an upper side and the barcode 2402 at a lower side. The barcode 2402 has identification information such as the terminal ID of the communication terminal 5 printed after being converted into the barcode. Note that the barcode 2402 is one example of an identification code indicating identification information of the communication terminal 5. The barcode 2402 can be, for example, another type of identification code such as a QR code (registered trademark).

FIG. 21C is a view of the sensor unit 1603B viewed in the direction of the arrow 2406 of FIG. 21A. As illustrated, the sensor unit 1603B has the barcode 2403 at an upper side and the camera 2404 on a lower side. The barcode 2403 has identification information such as the terminal ID of the communication terminal 5 printed after being converted into the barcode. Thus, the sensor units 1603A and 1603B are such that the arrangements of the cameras and the barcodes are symmetrical. Therefore, when, for example, another communication terminal 5 is placed on the right side or the left side of the communication terminal 5, side by side, in such a manner that the vertical positions are the same as one another, the camera of the communication terminal 5 faces the barcode of the other communication terminal 5.

Similarly, as illustrated in FIG. 21A, on the top and bottom sides of the communication terminal 5, the sensor units 1603C and 1603D are installed, respectively, in such a manner that the respective positions are the same in the horizontal directions. Further, the sensor units 1603C and 1603D are such that the positions of the cameras and the barcodes are symmetrical. Thereby, when, for example, another communication terminal 5 is placed on the upper side or the lower side of the communication terminal 5 adjacently in such a manner that the horizontal positions are the same as one another, the camera of the communication terminal 5 faces the barcode of the other communication terminal 5.

Further, preferably, the respective cameras (image taking units) of the sensor units 1603A-1603D in FIG. 21A have automatic focusing functions, respectively, and output distance information acquired at a time of focusing to the controller 1601 of FIG. 13. The thus output distance information is stored in the primary storage unit 1602 of FIG. 13 by the controller 1601 in the column "distance" 1803 of the terminal position information 1800 of FIG. 15. Note that it is also possible that the distance information is calculated by the controller 1601 based on data or information that is output by the respective cameras.

By the above-mentioned configuration, it is possible to provide, at a reduced cost, a mechanism by which it is possible to detect the terminal ID of and the distance from another communication terminal 5. Further, it is also possible to improve the reliability since a likelihood of interference occurring when both communication terminals are placed adjacently can be reduced.

Note that a sensor unit 1603 such as any one of those 1603A-1603D in which a camera and a barcode are integrally included is one example, and it is also possible that a camera and a barcode are separately installed in a sensor unit 1603.

Second Example

FIGS. 22A, 22B and 22C illustrate configuration examples of sensor units in a second example according to the embodiment. As illustrated in FIG. 22A, on the right side and the left side of the communication terminal 5, sensor units 1603A and 1603B in each of which an IC card reader and a IC card are integrally included are mounted in such a manner that they have approximately the same heights. The reading surface of the IC card reader (IC tag reader) 2501 and the IC card (IC tag) 2502 of the sensor unit 1603A are installed to face outward from the end face of the communication terminal 5. Similarly, the reading surface of the IC card reader (IC tag reader) 2504 and the IC card (IC tag) 2503 of the sensor unit 1603B are installed to face outward from the end face of the communication terminal 5.

FIG. 22B is a view of the sensor unit 1603A viewed in the direction of the arrow 2505 of FIG. 22A. As illustrated, the sensor unit 1603A has the IC card reader 2501 at an upper side and the IC card 2502 at a lower side. The IC card 2502 has identification information such as the terminal ID of the communication terminal 5 stored therein after being encoded.

FIG. 22C is a view of the sensor unit 1603B viewed in the direction of the arrow 2506 of FIG. 22A. As illustrated, the sensor unit 1604A has the IC card 2503 at an upper side and the IC card reader 2504 at a lower side. The IC card 2503 has identification information such as the terminal ID of the communication terminal 5 stored therein after being encoded. Thus, the sensor units 1603A and 1603B are such that the arrangements of the IC card readers and the IC cards are symmetrical. Thereby, when, for example, another communication terminal 5 is placed on the right side or the left side of the communication terminal 5, side by side, in such a manner that the vertical positions are the same as one another, the IC card reader of the communication terminal 5 faces the IC card of the other communication terminal 5.

Similarly, as illustrated in FIG. 22A, on the top and bottom sides of the communication terminal 5, the sensor units 1603C and 1603D are installed, respectively, in such a manner that the respective positions are the same in the horizontal directions. Further, the sensor units 1603C and 1603D are such that the positions of the IC cards and the IC card readers are symmetrical. Thereby, when, for example, another communication terminal 5 is placed on the top side or the bottom side of the communication terminal 5 adjacently in such a manner that the horizontal positions are the same as one another, the IC card reader of the communication terminal 5 faces the IC card of the other communication terminal 5.

The IC card reader of the communication terminal 5/1 in the present example is capable of reading the terminal ID of the adjacent communication terminal 5/2 placed in a non-contact manner. For example, the IC card reader generates a magnetic field having a predetermined reach distance while an electric current is generated in a coil inside the IC card receiving the magnetic field when the IC card passes through the magnetic field. Then, an integrated circuit (IC) embedded in the IC card carries out communication with the IC card reader using the generated electric current.

As specific examples of the IC card, it is possible to cite a Felica (registered trademark), NFC (Near Field Communication), contact type RFID (Radio Frequency Identification) tag and so forth. Further, it is also possible that the IC card carries out communication of identification information by using another short distance wireless communication scheme or so. Note that the IC card is one example of an IC tag. The IC tag can have, for example, a form of a semiconductor chip, a module, or so, other than a shape of a card.

Further, according to the present example, the antenna sensitivity and/or the like in the IC card and the IC card reader is adjusted in such a manner that, when the outer covers of the communication terminals 5/1, 5/2, 5/3 or the like come into contact with or are likely to come into contact with each other (for example, within 5 mm), they can detect each other. Therefore, the communication terminal 5/1 in the present example detects the terminal position information when the distance from the adjacently arranged other communication terminal 5/2 or 5/3 or so is within a predetermined range (for example, within 5 mm).

By the above-mentioned configuration, it is possible to provide, at a reduced cost, a mechanism for acquiring the terminal ID of another communication terminal 5 placed adjacently by using a conventional technology. Further, since the terminal ID is detected when the communication terminals 5 are close together to come into contact or almost come into contact with one another, the reliability is high while flexibility may be insufficient.

Note that in the present example, it may be difficult to determine the distance of the communication terminal 5/1 from the adjacent communication terminal 5/2. Therefore, the controller 1601 of the communication terminal 5/1 determines the "distance" in the terminal position information 1800 of FIG. 15 as, for example, "0", and stores it, when the sensor unit 1603 has detected the adjacent communication terminal 5/2. Further, the controller 1601 of the communication terminal 5/1 determines the "distance" in the terminal position information 1800 of FIG. 15 as, for example, "NULL", and stores it, when the sensor unit 1603 cannot detect the adjacent communication terminal 5/2. Thus, the communication terminal 5/1 can acquire information as to whether there is (are) a communication terminal(s) 5/2, 5/3 and/or the like adjacently placed at a predetermined position(s), the specific position(s) thereof (above, below, left or right), the identification information (the terminal ID(s)) thereof and/or the like.

Note that the above-mentioned sensor unit 1603 such as any one of those 1603A-1603D having the IC card reader (IC tag reader) and the IC card (IC tag) integrally included therein is one example, and it is also possible that the IC card reader and the IC card are separately installed in a sensor unit 1603.

Figure 23:
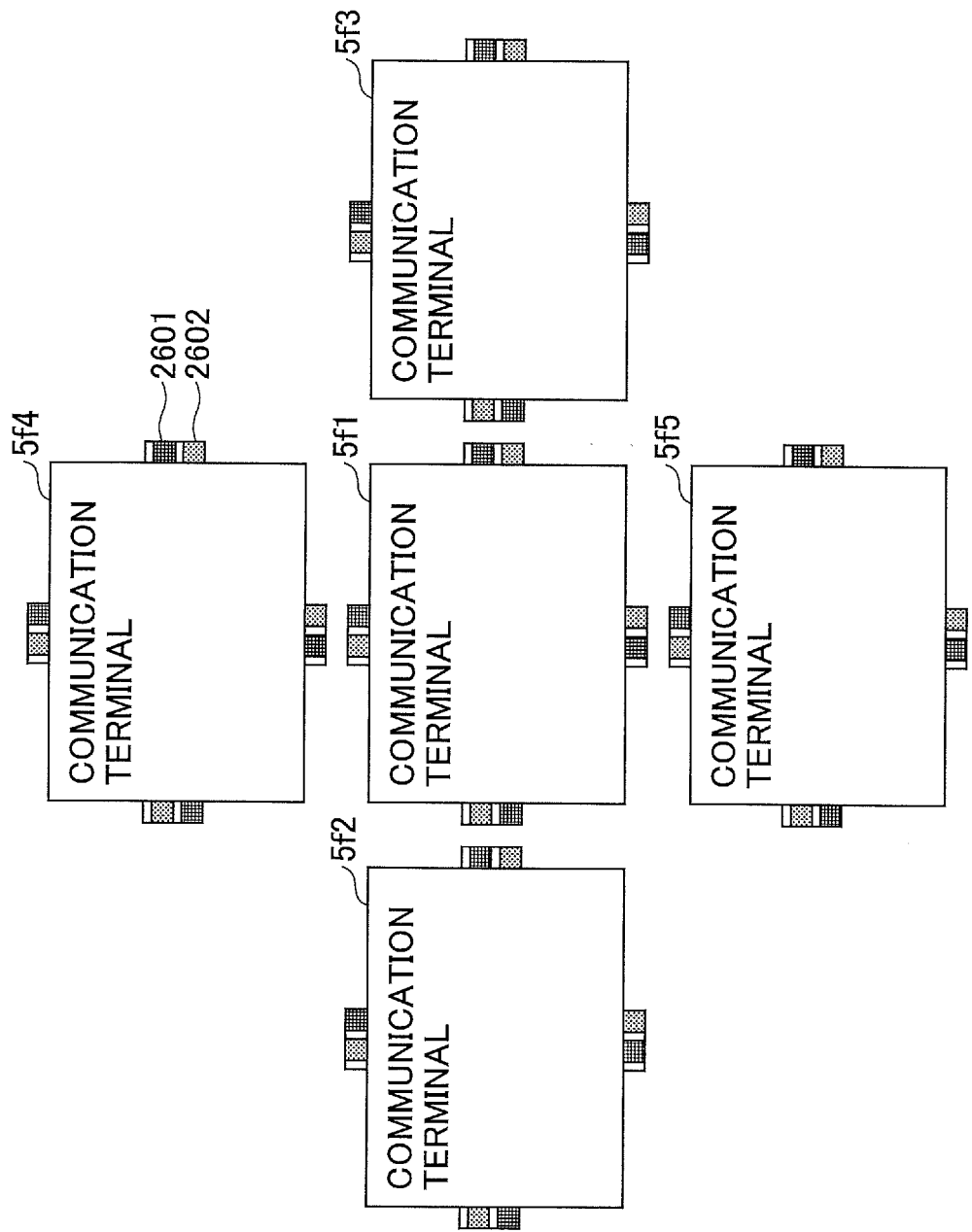
FIG. 23 illustrates one example of an arrangement of a plurality of the communication terminals according to the embodiment.

FIG. 23 illustrates one example of an arrangement of a plurality of communication terminals 5 according to the embodiment. In the example of FIG. 23, the communication terminal 5/2 is placed adjacently on the left side of the communication terminal 5/1, the communication terminal 5/3 is placed adjacently on the right side, the communication terminal 5/4 is placed adjacently above and the communication terminal 5/5 is placed adjacently below. In each of the above-mentioned first and second examples or so, when the communication terminals 5/1-5/5 are arranged adjacently in such a way, the position of each terminal ID holding unit 2602 such as the barcode, the IC card or so, faces the position of a corresponding adjacent terminal ID reading unit 2601 such as the camera, the IC card reader or so.

Third Example

Figure 24C:
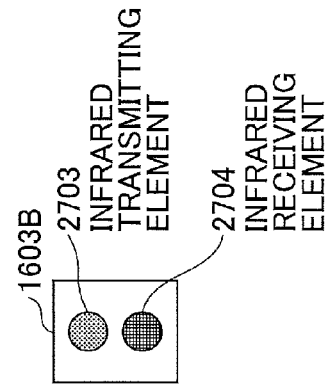
FIGS. 24A, 24B and 24C illustrate configuration examples of sensor units in a third example according to the embodiment.
Figure 24B:
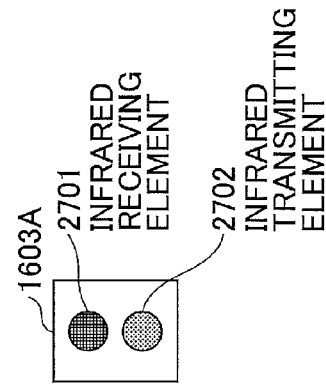
Figure 24A:
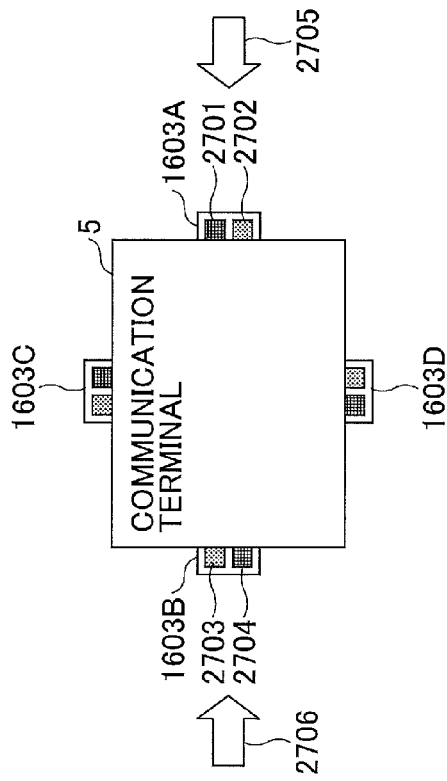

FIGS. 24A, 24B and 24C illustrate configuration examples of sensor units 1603 in a third example according to the embodiment. As illustrated in FIG. 24A, on the right side and the left side of the communication terminal 5, sensor units 1603A and 1603B in each of which an infrared receiving element and an infrared transmitting element are integrally included are mounted in such a manner that they have approximately the same heights. The infrared receiving element 2701 and the infrared transmitting element 2702 of the sensor unit 1603A are installed to face outward from the end face of the communication terminal 5. Similarly, the infrared receiving element 2704 and the infrared transmitting element 2703 of the sensor unit 1603B are installed to face outward from the end face of the communication terminal 5.

Note that, the infrared receiving elements 2701 and 2704 include light receiving elements, for example, photodiodes, phototransistors, photo Integrated Circuit (IC) or so. The infrared transmitting elements 2702 and 2703 include light emitting elements, for example, light emitting diodes or so.

The infrared receiving elements and the infrared transmitting elements can preferably employ, for example, hardware in accordance with Infrared Data Association (IrDA) standard, communication modules and/or the like. Further, "infrared rays" are example, and it is also possible that a configuration using light including visible light rays, ultraviolet rays, or so.

FIG. 24B is a view of the sensor unit 1603A viewed in the direction of the arrow 2705 of FIG. 24A. As illustrated, the sensor unit 1603A has the infrared receiving element 2701 at an upper side and the infrared transmitting element 2702 at a lower side. From the infrared transmitting element 2702, for example, identification information such as the terminal ID of the communication terminal 5 is transmitted.

FIG. 24C is a view of the sensor unit 1603B viewed in the direction of the arrow 2706 of FIG. 24A. As illustrated, the sensor unit 1603B has the infrared transmitting element 2703 on at an upper side and the infrared receiving element 2704 at a lower side. From the infrared transmitting element 2703, for example, identification information such as the terminal ID of the communication terminal 5 is transmitted.

Thus, the sensor units 1603A and 1603B are such that the arrangements of the infrared transmitting elements and the infrared receiving elements are symmetrical. Thereby, when, for example, another communication terminal 5 is placed on the right side or the left side of the communication terminal 5, side by side, in such a manner that the vertical positions are the same as one another, the infrared receiving element of the communication terminal 5 faces the infrared transmitting element of the other communication terminal 5.

Similarly, as illustrated in FIG. 24A, on the top and bottom sides of the communication terminal 5, the sensor units 1603C and 1603D are installed, respectively, in such a manner that the respective positions are the same in the horizontal directions. Further, the sensor units 1603C and 1603D are such that the positions of the infrared transmitting elements and the infrared receiving elements are symmetrical. Thereby, when, for example, another communication terminal 5 is placed on the upper side or the lower side of the communication terminal 5 adjacently in such a manner that the horizontal positions are the same as one another, the infrared receiving element of the communication terminal 5 faces the infrared transmitting element of the other communication terminal 5.

In the above-mentioned configuration, when the distance between the communication terminal 5 and the other communication terminal 5 adjacently placed falls within a predetermined distance, infrared communication is established and the identification information is exchanged therebetween. Further, according to the present example, in comparison to a configuration using cameras or IC cards, it is possible to provide the sensor units 1603 stronger or more durable at a reduced cost.

Note that in the present example, it may be difficult to determine the distance of the communication terminal 5/1 from the other communication terminal 5/2 adjacently placed. Therefore, the controller 1601 of the communication terminal 5/1 determines the "distance" in the terminal position information 1800 of FIG. 15 as, for example, "0", and stores it, when the sensor units 1603 have detected the other communication terminal 5/2 adjacently placed. Further, the controller 1601 of the communication terminal 5/1 determines the "distance" in the terminal position information 1800 of FIG. 15 as, for example, "NULL", and stores it, when the sensor units 1603 cannot detected the other communication terminal 5/2 adjacently placed. Thereby, the communication terminal 5/1 can acquire information as to whether there is (are) the communication terminal(s) 5/2, 5/3 and/or so adjacently placed at a predetermined position(s), the specific position(s) thereof (above, below, left or right), the identification information (the terminal ID(s)) thereof and/or the like.

Note that such a sensor unit 1603 as any one of those 1603A-1603D where the infrared receiving element and the infrared transmitting element are integrally included is an example, and it is also possible that the infrared receiving element and the infrared transmitting element are separately installed in a sensor unit 1603.

Fourth Example

FIG. 25 illustrates a configuration example of sensor units in a fourth example of the embodiment. According to the present example, the transmitting and receiving surfaces of the sensor units 1603A and 1603B in the third example are installed to have a predetermined angle θ to the normal of the installation floor face 2801 of the communication terminals 5/1 and 5/2, the sides on which sensor units are installed, or so.

For example, a transmitting and receiving surface 2805A denotes a surface that faces the receiving (light receiving)

direction of the infrared receiving element (light receiving element) 2701 and/or the transmitting (light emitting) direction of the infrared transmitting element (light emitting element) 2702 of the sensor unit 1603A. In this case, the transmitting and receiving surface 2805A of the sensor unit 1603A is installed to have a predetermined angle θ to the normal 2802B of the installation floor face 2801 or the side 2803 of the communication terminal 5/1 corresponding to the sensor unit 1603A and faces obliquely upward.

Similarly, for example, a transmitting and receiving surface 2805B denotes a surface that faces the receiving (light receiving) direction of the infrared receiving element (light receiving element) 2704 and/or the transmitting (light emitting) direction of the infrared transmitting element (light emitting element) 2703 of the sensor unit 1603B. In this case, the transmitting and receiving surface 2805B of the sensor unit 1603B is installed to have a predetermined angle θ to the normal 2802A of the installation floor face 2801 or the side 2804 of the communication terminal 5/1 corresponding to the sensor unit 1603B and faces obliquely downward. Note that it is assumed that the communication terminal 5/2 (another communication terminal) has the same configuration as the communication terminal 5/1.

Further, such a configuration is provided that the transmitting and receiving directions of the sensor unit 1603A of the communication terminal 5/1 are approximately the same as the transmitting and receiving directions of the sensor unit 1603B of the communication terminal 5/2, when the communication terminal 5/1 is placed on the installation floor face 2801 in the same direction as the communication terminal 5/2, side by side, as illustrated in FIG. 25. In other words, such a configuration is provided that the transmitting and receiving surface 2805A of the sensor unit 1603A in the communication terminal 5/1 faces the transmitting and receiving surface 2805B of the sensor unit 1603B in the communication terminal 5/2.

Figure 26:
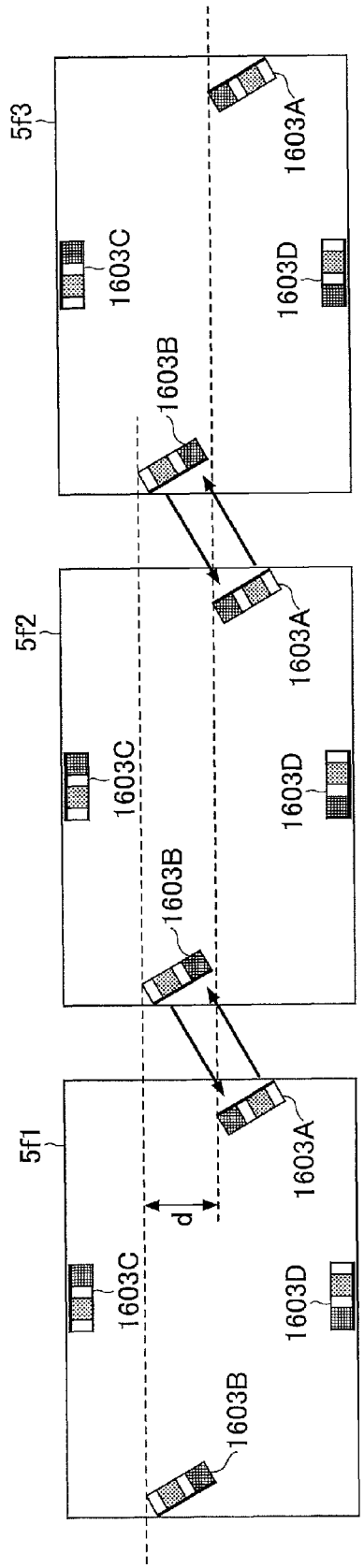
FIG. 26 illustrates one example of an arrangement of a plurality of the communication terminals in the fourth example according to the embodiment.

FIG. 26 illustrates an arrangement example of the sensor units according to the fourth example. As illustrated in FIG. 26, the sensor units 1603A of the respective communication terminals 5/1-5/3 are placed to have a predetermined distance "d" from the sensor units 1603B of the respective communication terminals 5/1-5/3 vertically so that when the respective communication terminal 5/1-5/3 are placed, side by side, the transmitting and receiving directions of the sensor units 1603A become approximately the same as the transmitting and receiving directions of the sensor units 1603B.

By thus providing the predetermined distance "d" and the predetermined angle θ mentioned above, the sensor unit 1603A of the communication terminal 5/1 faces the sensor unit 1603B of the communication terminal 5/2 when the three communication terminals 5/1-5/3 are arranged, side by side, as illustrated in FIG. 26, and thus, the communication terminal 5/1 can carry out communication with the communication terminal 5/2. On the other hand, the sensor unit 1603A of the communication terminal 5/1 does not face the sensor unit 1603B of the communication terminal 5/3, and therefore, it is difficult for the communication terminal 5/1 to carry out communication with the communication terminal 5/3.

Thus, by changing the values of the predetermined distance "d" and the predetermined angle θ, it is possible to adjust the distance between the communication terminals 5/1-5/3 at which they can recognize each other.

Note that the configurations illustrated in FIGS. 25 and 26 are examples. For example, it is also possible that the sensor units 1603A of the communication terminals 5/1-5/3 are installed to face obliquely downward at a predetermined angle θ and the sensor units 1603B of the communication terminals 5/1-5/3 are installed to face obliquely upward at the predetermined angle θ. In this case, the sensor units 1603B are placed to have a predetermined distance "d" from the sensor units 1603B vertically in the reverse direction so that when the respective communication terminals 5/1-5/3 are placed, side by side, the transmitting and receiving directions of the sensor units 1603A become approximately the same as the transmitting and receiving directions of the sensor units 1603B.

Note that, the value of the predetermined angle θ is determined appropriately depending on, for example, the light emitting range of the infrared transmitting elements of the sensor units 1603 which is the transmittable angle, the light receiving range of the infrared receiving elements of the sensor units 1603 which is the receivable angle, and/or the like. Alternatively, it is also possible to adapt the light emitting range and/or the light receiving range to the predetermined angle θ by using light blocking plates and/or condensing lenses which will be described later.

In any case, since infrared communication may become difficult when the value of the predetermined angle θ exceeds ±90°, it is preferable to determine the predetermined angle θ in a range of "0°<θ<±90°".

Fifth Example

Figure 27:
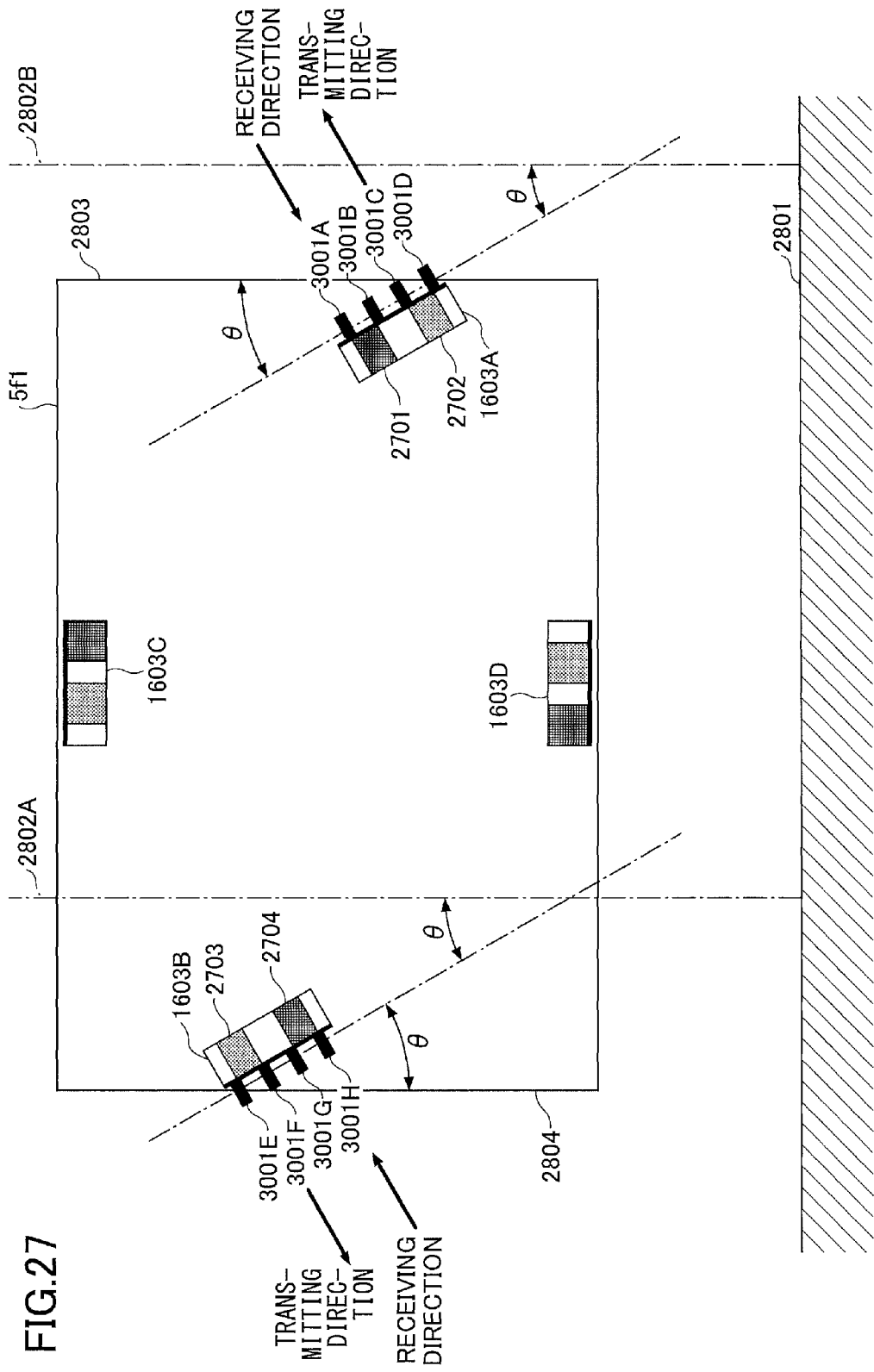
FIG. 27 illustrates a configuration example of sensor units in a fifth example of the embodiment.

FIG. 27 illustrates a configuration example of sensor units in a fifth example of the embodiment. The communication terminal 5/1 according to the fifth example is such that light blocking plates are provided in the transmitting direction and/or the receiving direction of the sensor units 1603A and 1603B concerning the fourth example for controlling the directivity of light (infrared rays) (reducing the receivable and/or transmittable angles).

For example, in FIG. 27, light blocking plates 3001A and 3001B are installed in the receiving direction of the infrared receiving element (light receiving element) 2701 of the sensor unit 1603A. By the light blocking plates 3001A and 3001B, the receiving range of the infrared receiving element 2701 which is the angle of being able to receive light (receivable angle) is controlled (reduced). Similarly, light blocking plates 3001C and 3001D are installed in the transmitting direction of the infrared transmitting element (light emitting element) 2702 of the sensor unit 1603A. By the light blocking plates 3001C and 3001D, the transmitting range of the infrared transmitting element 2702 which is the angle of being able to transmit light (transmittable angle) is controlled (reduced).

Similarly, light blocking plates 3001E and 3001F are installed in the transmitting direction of the infrared transmitting element (light receiving element) 2703 of the sensor unit 1603B and light blocking plates 3001G and 3001H are installed in the receiving direction of the infrared receiving element (light receiving element) 2704 of the sensor unit 1603B.

By the above-mentioned configuration, it is possible to control (reduce) the widths of the distance at which the communication terminal 5/1 can detect the other communication terminals 5/2 and 5/3 placed, side by side, reduce malfunction, and so forth.

Note that the configuration of FIG. 27 is an example and does not limit the scope of the present invention. For example, the light blocking plates 3001A and 3001B installed in the receiving direction of the infrared receiving element 2701 are not necessarily symmetrical. For example, the lengths, the angles, and/or the like of the light blocking plates 3001A and 3001B can be made different therebetween depending on a request, a use and/or the like of a system. This also applies to the other light blocking plates 3001C-3001H.

The light blocking plates 3001C, 3001D, 3001E and 3001F are examples of light blocking plates for controlling the directivity of light (infrared rays) to be transmitted. Also, the light blocking plates 3001A, 3001B, 3001G and 3001H are examples of light blocking plates for controlling the directivity of light (infrared rays) to be received. For example, the light blocking plates 3001A-3001H can have other shapes as long as they control the directivity of light (reduce the receivable and transmittable angles) to be transmitted and received.

Sixth Example

Figure 28:
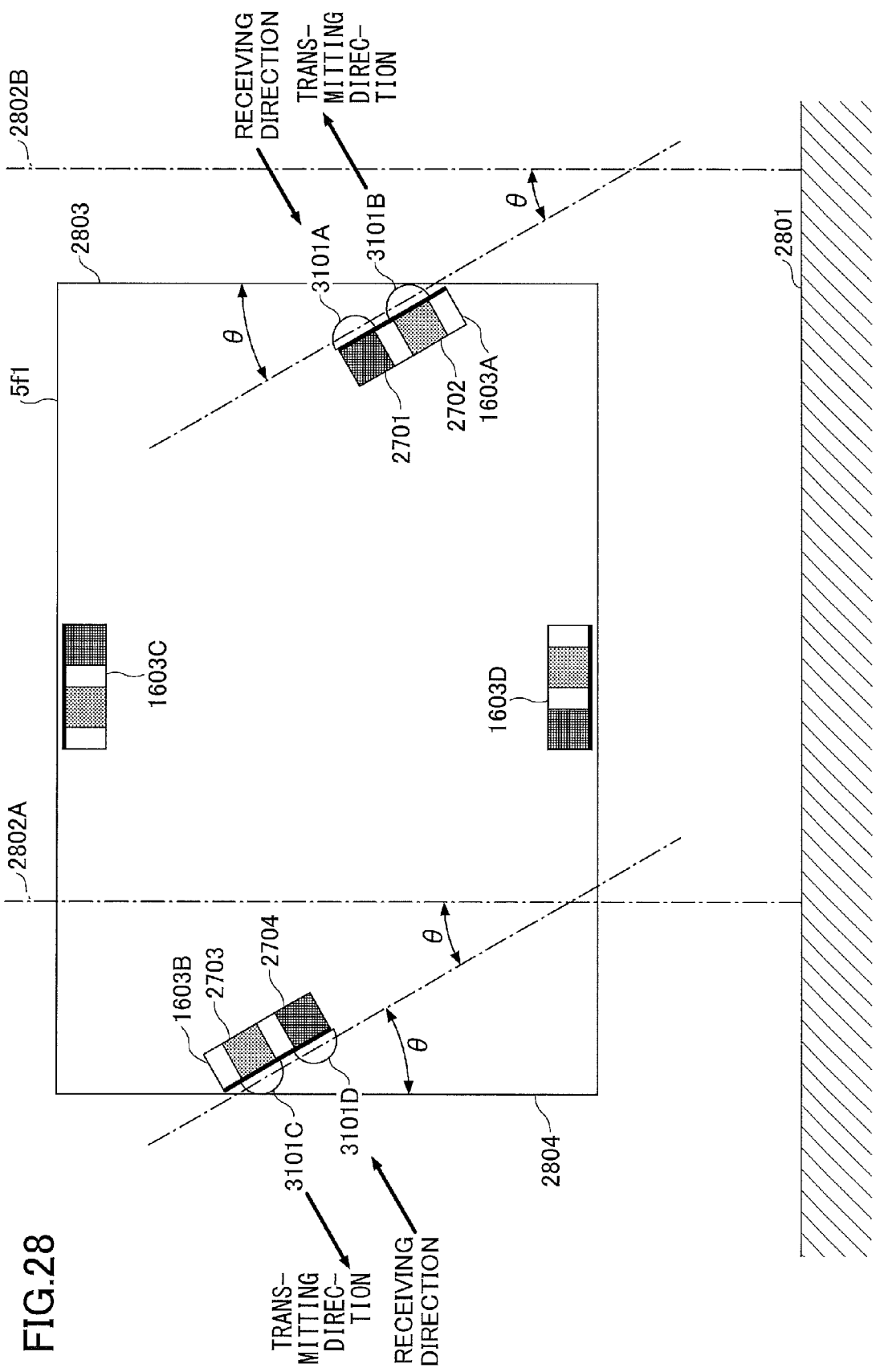
FIG. 28 illustrates a configuration example of sensor units in a sixth example of the embodiment.

FIG. 28 illustrates a configuration example of sensor units in a sixth example of the embodiment. The communication terminal 5/1 according to the sixth example is such that condensing lenses are provided in the transmitting direction and/or the receiving direction of the sensor units 1603A and 1603B concerning the fourth example for controlling the directivity of light (infrared rays) (reducing the receivable and/or transmittable angles).

For example, in FIG. 28, a condensing lens 3101A is installed in the receiving direction of the infrared receiving element (light receiving element) 2701 of the sensor unit 1603A. By the condensing lens 3101A, the receiving range of the infrared receiving element 2701 which is the angle of being able to receive light (receivable angle) is controlled (reduced). Similarly, a condensing lens 3101B is installed in the transmitting direction of the infrared transmitting element (light emitting element) 2702 of the sensor unit 1603A. By the condensing lens 3101B, the transmitting range of the infrared transmitting element 2702 which is the angle of being able to transmit light (transmittable angle) is controlled (reduced).

Similarly, a condensing lens 3101C is installed in the transmitting direction of the infrared transmitting element (light emitting element) 2703 of the sensor unit 1603B and a condensing lens 3101D is installed in the receiving direction of the infrared receiving element (light receiving element) 2704 of the sensor unit 1603B.

By the above-mentioned configuration, it is possible to control (reduce) the widths of the distance at which the communication terminal 5/1 can detect the other communication terminals 5/2 and 5/3 placed, side by side, reduce malfunction, and so forth.

When the sensor units 1603A and 1603B include condensing lenses, it is preferable to provide the condensing lenses 3101A-3101D in addition to the condensing lenses included in the sensor units 1603A and 1603B. Thereby, even when general-purpose sensor units, for example, IrDA communication modules or so, are used, it is possible to control (reduce) the widths of the distance at which the communication terminal 5/1 can detect the other communication terminals 5/2 and 5/3 placed, side by side, reduce malfunction, and so forth.

Other Examples

In the above-mentioned fourth to sixth examples, the sensor units 1603A and 1603B of the communication terminal 5/1 have been described. However, the same configuration can be applied also to the sensor units 1603C and 1603D.

Figure 29:
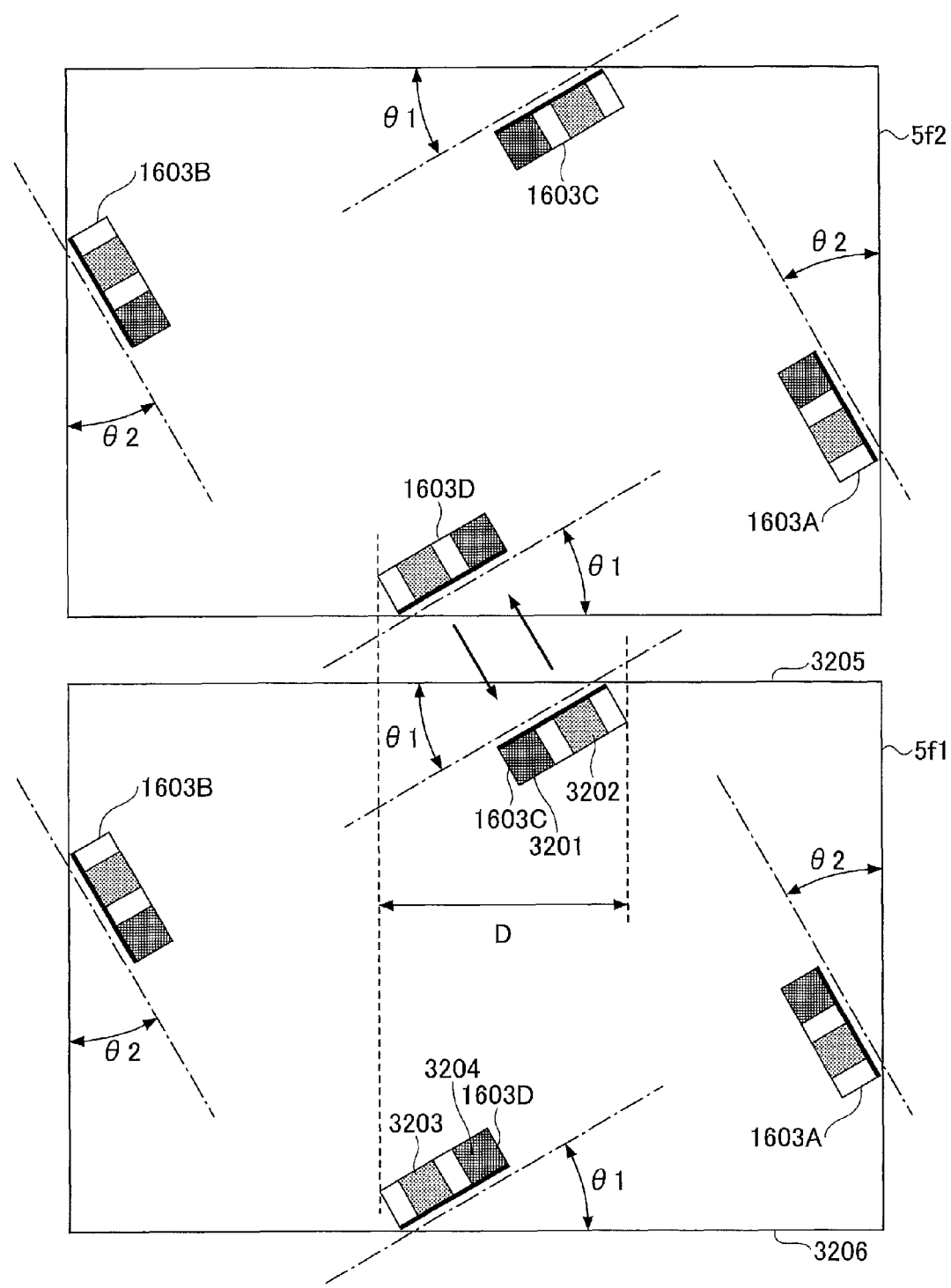
FIG. 29 illustrates a configuration example of sensor units in a seventh example of the embodiment.

FIG. 29 illustrates a configuration example of sensor units in a seventh example of the embodiment. The sensor unit 1603C of the communication terminal 5/1 is installed while being inclined by a predetermined angle θ1 to the direction of the side 3205 on which the sensor unit 1603C is installed to face obliquely leftward. Similarly, the sensor unit 1603D of the communication terminal 5/1 is installed while being inclined by the predetermined angle θ1 to the direction of the side 3206 on which the sensor unit 1603D is installed to face obliquely rightward. Also the sensor units 1603C and 1603D of the communication terminal 5/2 have the inclinations of the predetermined angle θ1 in the same way.

Further, the sensor unit 1603C of the communication terminal 5/1 is placed to have a predetermined distance "D" horizontally with respect to the sensor unit 1603D of the communication terminal 5/2 so that the transmitting and receiving surface of the sensor unit 1603C of the communication terminal 5/1 faces the transmitting and receiving surface of the sensor unit 1603D of the communication terminal 5/2 when the communication terminal 5/2 is placed above the communication terminal 5/1 adjacently while the horizontal positions thereof are made to be the same as one another as illustrated in FIG. 29. In the above-mentioned configuration, by changing the values of the predetermined distance "D" and the predetermined angle θ1, it is possible to adjust the distance between the communication terminals 5/1 and 5/2 adjacently placed vertically at which they can recognize each other.

It is also possible that the sensor units 1603C and 1603D of the communication terminals 5/1 and 5/2 have the light blocking plates described above in the fifth example and/or the condensing lenses described above in the sixth example. Note that the value of the predetermined angle (inclination) θ1 of the sensor units 1603C and 1603D can be the same as or different from the value of the predetermined angle (inclination) θ2 (corresponding to the above-mentioned predetermined angle θ) of the sensor units 1603A and 1603B.

<Process of Detecting Position Information>

Next, a flow of a process of detecting the terminal position information in the communication terminal 5/1 will be described by citing some examples.

Figure 30:
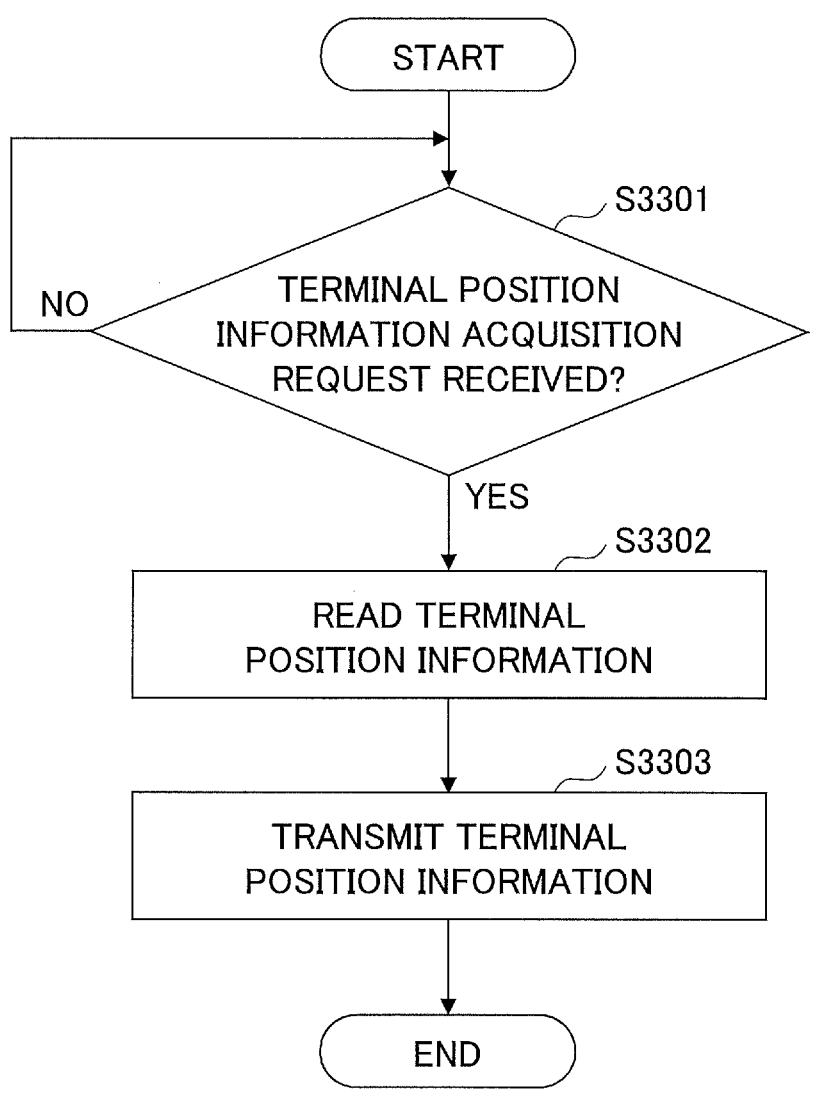
FIG. 30 is a flowchart illustrating one example of a notification process of terminal position information in the communication terminal according to the embodiment.

FIG. 30 is a flowchart illustrating one example of a notification process of the terminal position information in the communication terminal 5/1 according to the embodiment. The terminal management system 7 transmits a request to acquire the terminal position information ("terminal position information acquisition request") at predetermined time intervals (for example, every second) to the communication terminal 5/1. Further, the communication terminal 5/1 drives the sensor units 1603 at a predetermined timing, detects the terminal position information including information indicating the positions of other communication terminals 5 and stores the detected terminal position information in the primary storage unit 1602.

In FIG. 30, the controller 1601 of the communication terminal 5/1 determines whether to have received a "terminal position information acquisition request" (Step S3301). When receiving a "terminal position information acquisition request", the controller 1601 reads the terminal position information stored in the primary storage unit 1602 (Step S3302). Further, the controller 1601 transmits the thus read terminal position information to the terminal management system 7 via the transmitting unit 1102 (Step S3303).

By repeating the process of FIG. 30, the communication terminal 5/1 transmits the terminal position information in response to a "terminal position information acquisition request" from the terminal management system 7.

Figure 31:
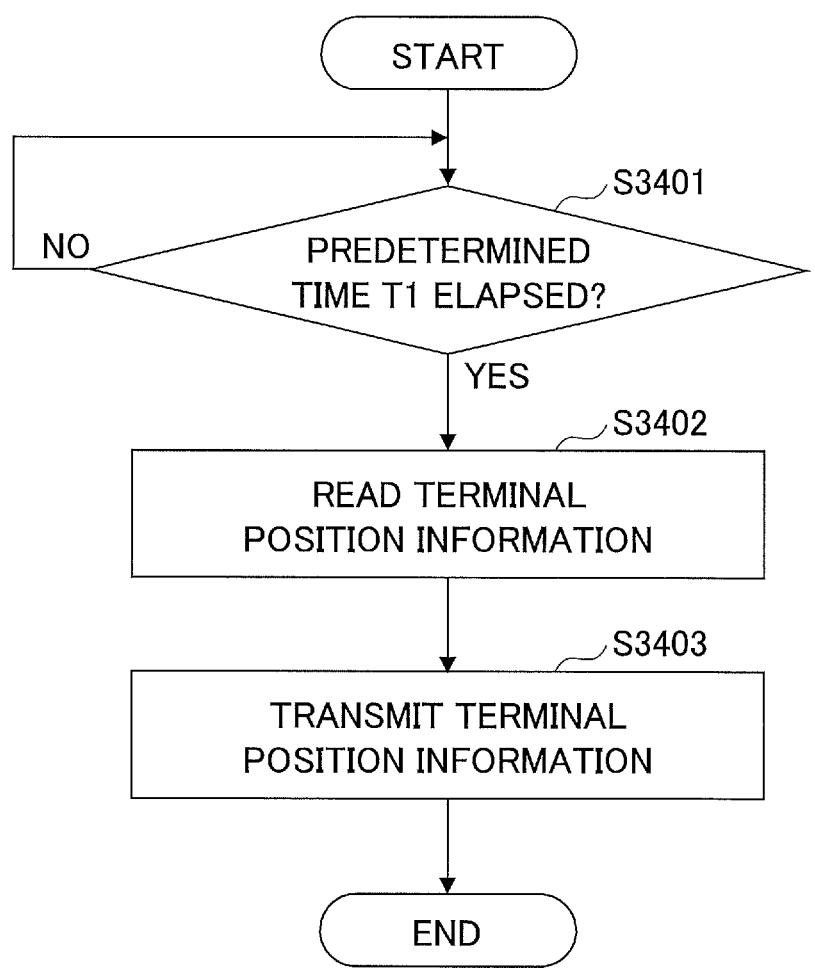
FIG. 31 is a flowchart illustrating another example of a notification process of terminal position information of the communication terminal according to the embodiment.

FIG. 31 is a flowchart illustrating another example of a notification process of the terminal position information of the communication terminal 5/1 according to the embodiment. In FIG. 31, the controller 1601 of the communication terminal 5/1 reads the terminal position information stored in the primary storage unit 1602 (Step S3402) when a predetermined time T1 has elapsed (for example, 1 second) (Step S3401). Further, the controller 1601 transmits the thus read terminal position information to the terminal management system 7 via the transmitting unit 1102 (Step S3403).

By repeating the process of FIG. 31, the communication terminal 5/1 transmits the terminal position information to the terminal management system 7 every predetermined time interval.

Note that the processes ("notification processes") of detecting the terminal position information illustrated in FIGS. 30 and 31 are examples. For example, it is also possible that the communication terminal 5/1 transmits the terminal position information to the terminal management system 7 in response to a change in the terminal position information.

Figure 32:
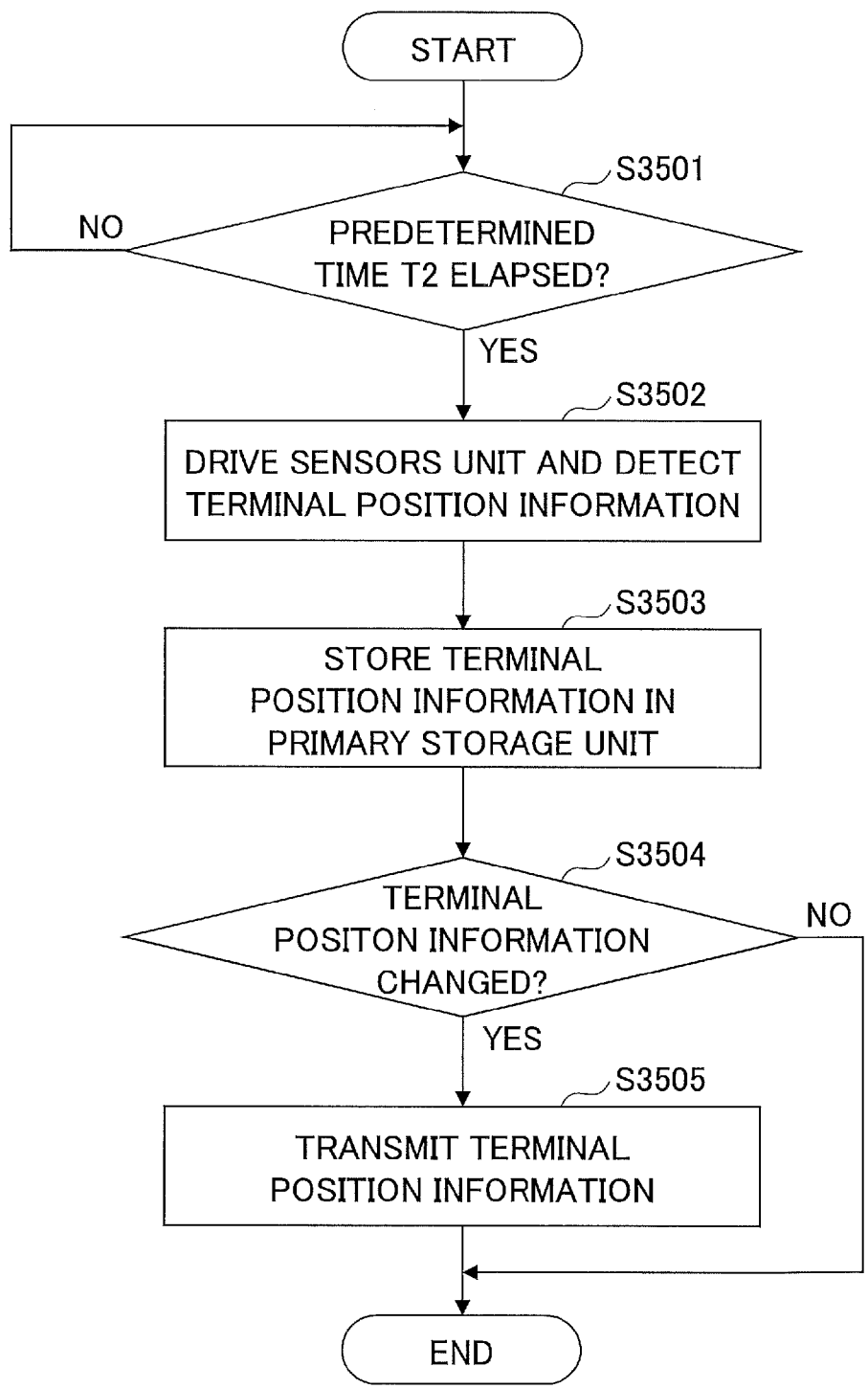
FIG. 32 is a flowchart illustrating a notification process in response to a change in terminal position information according to the embodiment.

FIG. 32 is a flowchart illustrating a notification process in response to a change in the terminal provision information according to the embodiment. As illustrated in FIG. 32, the controller 1601 of communication terminal 5/1 drives the sensor units 1603 when a predetermined time T2 (for example, 500 ms) has elapsed (Step S3501) and detects the terminal position information (Step S3502). Further, the controller 1601 of the communication terminal 5/1 stores the thus detected terminal position information in the primary storage unit 1602 (Step S3503). Then, the controller 1601 compares the previous detection result of the terminal position information stored in the primary storage unit 1602 with the current detection result detected in Step S3502 and determines whether the terminal position information has changed (Step S3504).

When the terminal position information has changed in Step S3504, the controller 1601 transmits the current terminal position information detected in Step S3502 to the terminal management system 7. On the other hand, when the terminal position information has not changed in Step S3504, the controller 1601 needs not transmit the terminal position information.

By repeating the above-mentioned process, it is possible to transmit the terminal position information to the terminal management system 7 when detecting that the terminal position information has changed, i.e., when the positional relationship between the communication terminal 5/1 and another communication terminal(s) 5 has changed. It is also possible to carry out the process of FIG. 32 in combination with the process of FIG. 30, the process of FIG. 31, and/or the like.

When receiving the terminal position information from the communication terminal 5/1 through, for example, any one of or any combination of the processes of FIG. 30-32, the terminal management system 7 updates the information of "data label" 2302, "ID" 2303 and "distance" 2304 of the terminal arrangement management table 1902 of FIG. 20. Further, the terminal management system 7 determines the positional relationship between the plurality of communication terminals 5 based on the thus updated "data label" 2302, "ID" 2303, "distance" 2304 and so forth and updates the information of "arranged position" 2305. Further, the terminal management system 7 updates the "installation position" in the terminal management table of FIG. 18 based on the "arranged position" 2305 of the terminal arrangement management table 1902.

<Process of Multidisplay>

Figure 33:
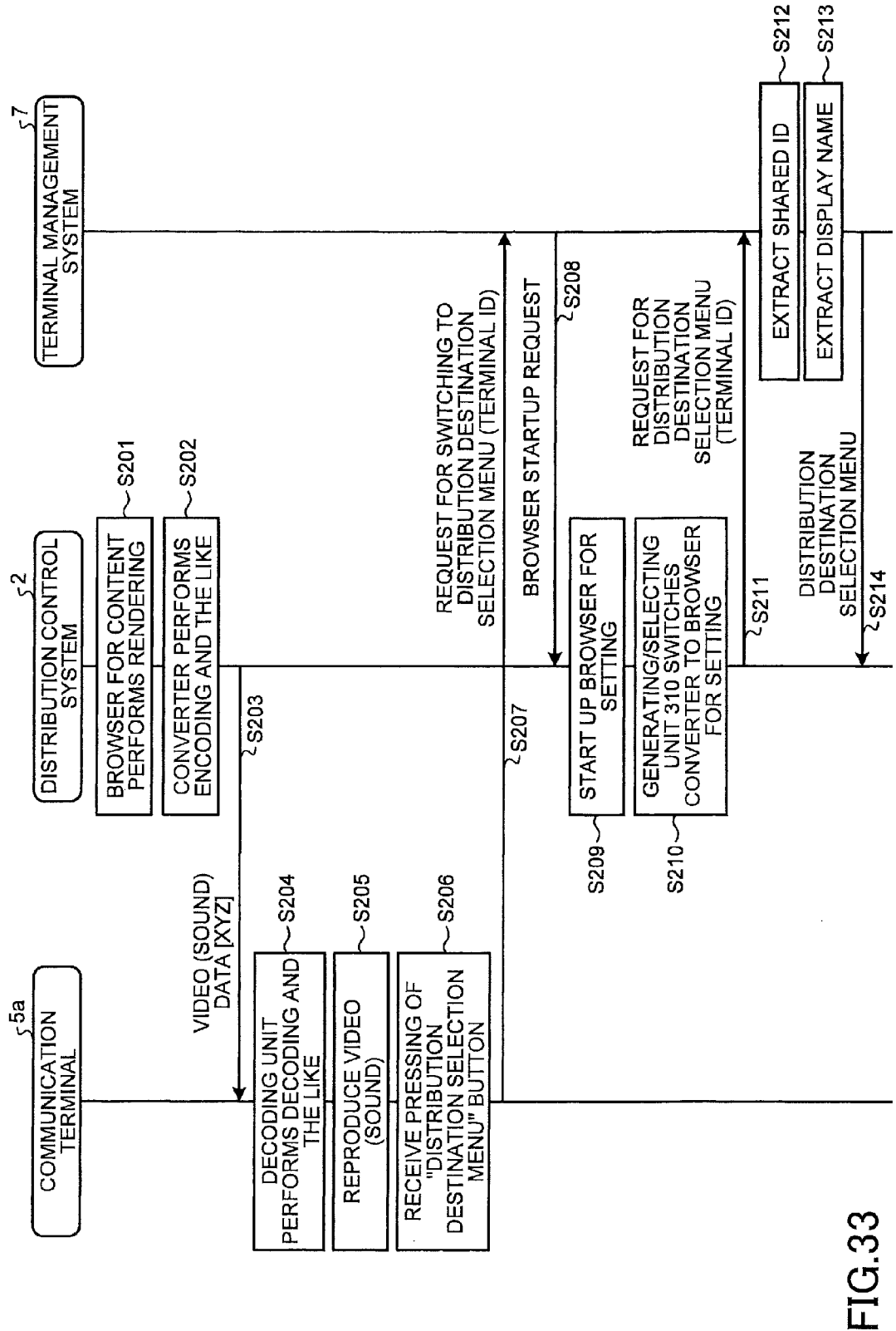
FIGS. 33, 34 and 35 are a sequence diagram illustrating a "multidisplay" process.
Figure 34:
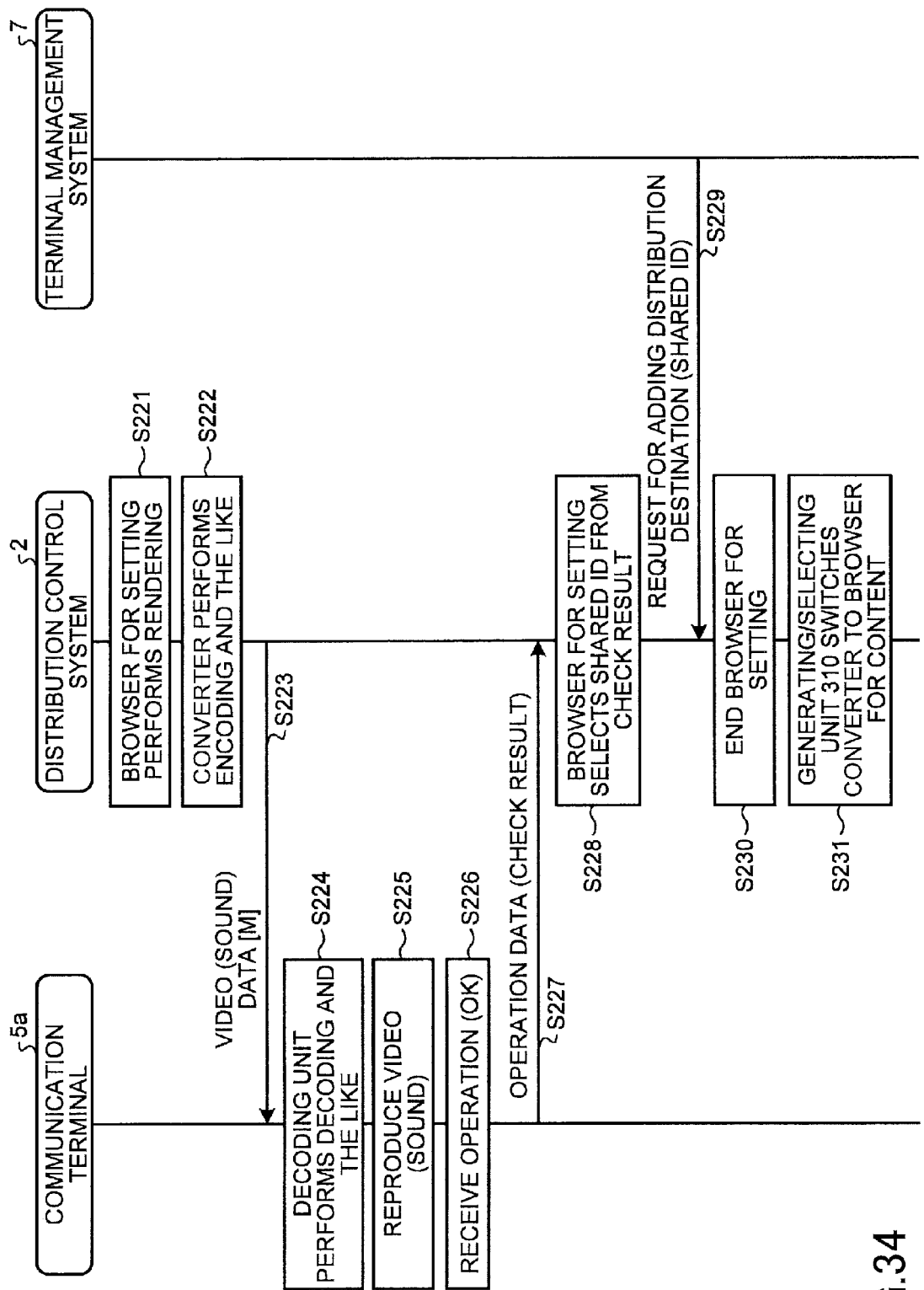
Figure 35:
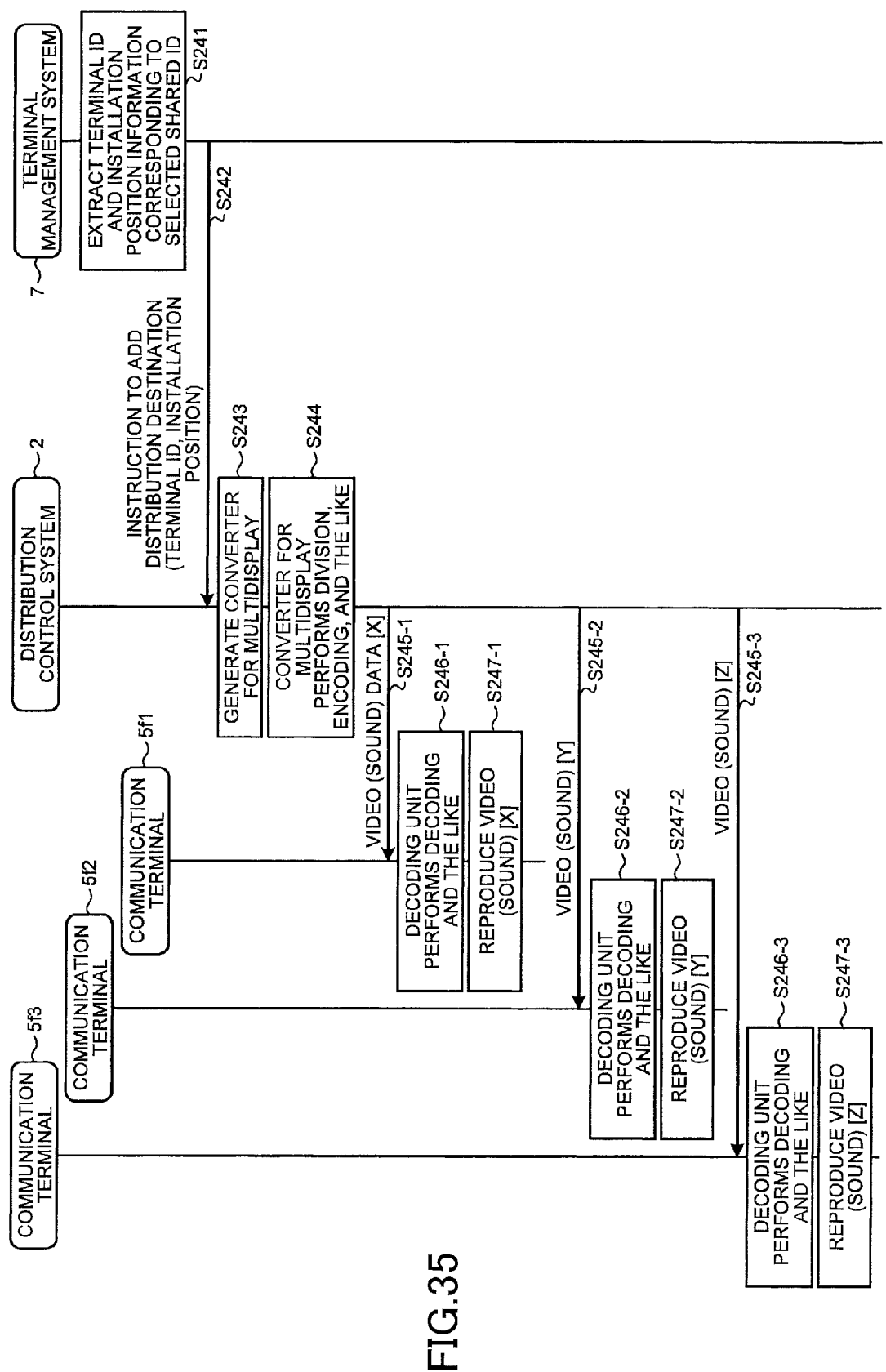

Described next with reference to FIGS. 33-35 is the process of "multidisplay". FIGS. 33-35 are sequence diagrams illustrating the process of "multidisplay" illustrated in FIG. 4.

Described here is an example of reproducing video (sound) [XYZ] being reproduced on the communication terminal 5a also on the communication terminals (5/1, 5/2, 5/3) in a divided manner.

The browser 20 for displaying web content is represented as a "browser 20a", and the browser 20 for displaying a setting screen for a user is represented as a "browser 20b".

First, the browser 20a of the distribution control system 2 renders the web content data [XYZ] acquired from the web server 8, thereby generating pieces of frame data as pieces of still image (sound) data and outputs them to the transmission FIFO 24 (Step S201). The converter 10 encodes the pieces of frame data stored in the transmission FIFO 24, thereby converting them into video (sound) data [XYZ] of a data format capable of being transmitted to the communication terminal 5a (Step S202).

The transmitter/receiver 31 transmits the video (sound) data [XYZ] after being converted by the converter 10 to the transmitter/receiver 51 of the communication terminal 5a (Step S203). This causes the transmitter/receiver 51 of the communication terminal 5a to receive the video (sound) data [XYZ] and to output it to the reproduction controller 53.

In the communication terminal 5a, the decoding unit 50 acquires the video (sound) data [XYZ] from the reproduction controller 53 and decodes it (Step S204). After that, the speaker 61 reproduces sound based on decoded sound data [XYZ], and the display unit 58 reproduces video based on video data [XYZ] acquired from the decoding unit 50 and rendered by the rendering unit 55 (Step S205).

A screen displayed on the display unit 58 is switched to a menu request screen (not illustrated) by the user of the communication terminal 5a, and the operating unit 52 receives pressing of a "distribution destination selection menu" (not illustrated) on the menu request screen (Step S206). This causes the transmitter/receiver 51 to transmit a request for switching to the distribution destination selection menu to the transmitter/receiver 71a of the terminal management system 7 (Step S207). This causes the transmitter/receiver 71a of the terminal management system 7 to receive the request for switching to the distribution destination selection menu. This request includes the terminal ID of the communication terminal 5a.

The transmitter/receiver 71b transmits a browser 20b startup request to the transmitter/receiver 21 of the distribution control system 2 (Step S208). This causes the transmitter/receiver 21 of the distribution control system 2 to receive the browser 20b startup request and to issue the browser 20b startup request to the browser management unit 22.

The browser management unit 22 starts up the browser 20b (Step S209). The generating/selecting unit 310 of the encoder bridge unit 30 switches the output from the browser 20a to the converter 10 (e.g., the converter 10a) to the output from the browser 20b to the converter 10 (e.g., the converter 10b) (Step S210). When the communication terminal 5a and another communication terminal 5 (e.g., the communication terminal 5b) are receiving the video (sound) data at Step S203 with the converter 10 (e.g., the converter 10a) shared, the generating/selecting unit 310 of the encoder bridge unit 30 newly generates the converter 10 (e.g., the converter 10b), because the other communication terminal 5 (e.g., the communication terminal 5b) is using the converter 10 (e.g., the converter 10a) for the browser 20a.

The transmitter/receiver 21 transmits a request for a distribution destination selection menu to the transmitter/receiver 71b of the terminal management system 7 in accordance with an instruction by the browser 20b (Step S211). In this situation, the terminal ID of the communication terminal 5a is also transmitted. This causes the transmitter/receiver 71b of the terminal management system 7 to receive the request for a distribution destination selection menu and to output the terminal ID of the communication terminal 5a to the storage unit 7000.

In response thereto, the storage unit 7000 of the terminal management system 7 searches the available terminal management table 7020 based on the terminal ID, thereby extracting the corresponding shared ID (Step S212). This shared ID indicates a communication terminal 5 available for the communication terminal 5a to perform a remote sharing process. As illustrated in FIG. 19, because the terminal ID of the communication terminal 5a is "t001", the shared IDs to be extracted are "v003" and "v006".

The storage unit 7000 further searches the terminal management table 7010 based on the extracted shared ID, thereby extracting display name information indicating the corresponding display name (Step S213). As illustrated in FIG. 18, display names corresponding to the extracted shared IDs "v003" and "v006" are "Tokyo head office 10F MFP" and "Osaka exhibition hall 1F multidisplay", respectively.

The transmitter/receiver 71b transmits distribution destination selection menu data [M] as content data to the transmitter/receiver 21 of the distribution control system 2 (Step S214). This causes the transmitter/receiver 21 of the distribution control system 2 to receive the distribution destination selection menu data [M] and to output it to the browser 20b. As illustrated in FIG. 17, this distribution destination selection menu data [M] includes check boxes, shared IDs, and display names.

As illustrated in FIG. 34, the browser 20b renders the content data indicating the distribution destination selection menu data [M] acquired from the terminal management system 7, thereby generating pieces of frame data as pieces of still image (sound) data and outputting them to the transmission FIFO 24 (Step S221). The converter 10 encodes the pieces of image (sound) data [M] stored in the transmission FIFO 24, thereby converting them into video (sound) data [M] of a data format capable of being transmitted to the communication terminal 5a (Step S222).

The transmitter/receiver 31 transmits the video (sound) data [M] after being converted by the converter 10 to the transmitter/receiver 51 of the communication terminal 5a (Step S223). This causes the transmitter/receiver 51 of the communication terminal 5a to receive the video (sound) data [M] and to output it to the reproduction controller 53.

In the communication terminal 5a, the decoding unit 50 acquires the video (sound) data [M] from the reproduction controller 53 and decodes it (Step S224). After that, the display unit 58 reproduces video as illustrated in FIG. 17 based on the video data [XYZ] acquired from the decoding unit 50 and rendered by the rendering unit 55 (Step S225).

In the distribution destination selection menu illustrated in FIG. 17, when the check box of the shared ID "v006" is checked and the "OK" button is pressed by the user, the operating unit 52 receives the operation input by the user (Step S226).

The transmitter/receiver 51 transmits the check result as operation data to the transmitter/receiver 31 of the distribution control system 2 (Step S227). This causes the transmitter/receiver 31 of the distribution control system 2 to receive the check result as operation data and to output it to the browser 20b.

The browser 20b selects the shared ID according to the check result (Step S228).

The transmitter/receiver 21 transmits a request for adding a distribution destination to the transmitter/receiver 71b of the terminal management system 7 in accordance with an instruction by the browser 20b (Step S229). This request for adding a distribution destination includes the shared ID selected at Step S228. This causes the transmitter/receiver 71b of the terminal management system 7 to receive the request for adding a distribution destination and to output the shared ID to the storage unit 7000. The browser 20b then ends its role to end (Step S230). This causes the generating/selecting unit 310 of the encoder bridge unit 30 to return the output from the browser 20b to the converter 10 to the output from the browser 20a to the converter 10 (Step S231).

As illustrated in FIG. 35, in the storage unit 7000 of the terminal management system 7, the terminal management table 7010 is searched based on the shared ID sent through Step S229, thereby extracting the corresponding "terminal ID" and "installation position" information (Step S241). The transmitter/receiver 71b transmits an instruction to add a distribution destination to the transmitter/receiver 21 of the distribution control system 2 (Step S242). This instruction to add a distribution destination includes the "terminal ID" and the "installation position" information extracted at Step S241. This causes the transmitter/receiver 21 of the distribution control system 2 to receive the instruction to add a distribution destination and to output the instruction to add a distribution destination to the browser management unit 22. Included here are three sets of the "terminal ID" and the "installation position" information, that is, the "terminal ID" and the "installation position" information are "t006" and "left", respectively, the "terminal ID" and the "installation position" information are "t007" and "middle", respectively, and the "terminal ID" and the "installation position" information are "t008" and "right", respectively.

The generating/selecting unit 310 of the encoder bridge unit 30 generates a converter 10 for "multidisplay" (Step S243). In this case, the generating/selecting unit 310 of the encoder bridge unit 30 acquires the "terminal ID" and the "installation position" information from the browser management unit 22.

The dividing unit 13 of the converter 10 generated at Step S243 divides the pieces of frame data [XYZ] as pieces of still image (sound) data stored in the transmission FIFO 24, and the encoding unit 19 encodes the divided pieces of frame data (Step S244).

The transmitter/receiver 31 transmits video (sound) data [X] encoded by the encoder bridge unit 30 to the transmitter/receiver 51 of the communication terminal 5/1 based on the "terminal ID" ("t006") and the "installation position" information ("left") (Step S245-1). This causes the transmitter/receiver 51 of the communication terminal 5/1 to receive the video (sound) data [X] and to output it to the reproduction controller 53.

In the communication terminal 5/1, the decoding unit 50 acquires the video (sound) data [X] from the reproduction controller 53 and decodes it (Step S246-1). After that, the speaker 61 reproduces sound based on decoded sound data [X], and the display unit 58 reproduces video based on video data [X] acquired from the decoding unit 50 and rendered by the rendering unit 55 (Step S247-1).

Similarly, the transmitter/receiver 31 transmits video (sound) data [Y] encoded by the encoder bridge unit 30 to the transmitter/receiver 51 of the communication terminal 5/2 based on the "terminal ID" ("t007") and the "installation position" information ("middle") (Step S245-2). This causes the transmitter/receiver 51 of the communication terminal 5/2 to receive the video (sound) data [Y] and to output it to the reproduction controller 53.

In the communication terminal 5/2, the decoding unit 50 acquires the video (sound) data [Y] from the reproduction controller 53 and decodes it (Step S246-2). After that, the speaker 61 reproduces a sound based on decoded sound data [Y], and the display unit 58 reproduces video based on video data [Y] acquired from the decoding unit 50 and rendered by the rendering unit 55 (Step S247-2).

Further similarly, the transmitter/receiver 31 transmits video (sound) data [Z] encoded by the encoder bridge unit 30 to the transmitter/receiver 51 of the communication terminal 5/3 based on the "terminal ID" ("t008") and the "installation position" information ("right") (Step S245-3). This causes the transmitter/receiver 51 of the communication terminal 5/3 to receive the video (sound) data [Z] and to output it to the reproduction controller 53.

In the communication terminal 5/3, the decoding unit 50 acquires the video (sound) data [Z] from the reproduction controller 53 and decodes it (Step S246-3). After that, the speaker 61 reproduces sound based on decoded sound data [Z], and the display unit 58 reproduces video based on video data [Z] acquired from the decoding unit 50 and rendered by the rendering unit 55 (Step S247-3).

Main Advantageous Effects of Present Embodiment

According to the embodiment described above, it is possible to easily display a given image by a plurality of display apparatuses (communication terminals 5) that are arranged by a user. At this time, a display apparatus according to the present embodiment autonomously detects the positional relationship between the display apparatus and another display apparatus(es). As a result, it is possible to display a given image by the plurality of display apparatuses without the need of troublesome work such as previously registering an arrangement of the display apparatuses or so, manually setting an arrangement of the display apparatuses or so, or so.

Further, even when the arrangement or the number of display apparatuses is changed or so while a given image is being displayed by the display apparatuses, the display apparatuses can properly display the display content. Further, it is possible to control various display states of content by using identification information (terminal ID(s)) and the distance(s) of one or more display apparatuses, and thus, usability improves.

[Supplementary Explanation]

The above-mentioned embodiment provides examples of a display apparatus and a display system according to the present invention, and there will be various applications thereof according to purposes and usages.

For example, in the above-mentioned embodiment, the case of "multidisplay" of FIG. 4 has been described. However, it is also possible to implement an application in a case of so-called "multicast". For example, a common image "A" can be distributed to each of the communication terminal 5/1, 5/2 and 5/3. In this state, when the communication terminal 5/2 is placed adjacently on the right side of the communication terminal 5/1, the detecting unit 1101 of the communication terminal 5/1 detects that the communication terminal 5/2 is placed on the right side of the communication terminal 5/1.

At this time, the display unit 1103 of the communication terminal 5/1 carries out control, for example, to display the left half of the distributed image "A". Similarly, when detecting that the communication terminal 5/1 is placed on the left side of the communication terminal 5/2, the communication terminal 5/2 displays the right half of the distributed image "A". Also by this way, it is possible to provide the same advantageous effect as in the above-mentioned embodiment. In this case, the image "A" is not necessarily an image distributed by a server. For example, it is also possible that the image "A" is a common image or so acquired from an external recording medium or so.

The distribution system 1 according to the present embodiment includes the terminal management system 7 and the distribution control system 2 as separate systems. For example, the terminal management system 7 and the distribution control system 2 can be included in an integral system by, for example, causing the distribution control system 2 to have the functions of the terminal management system 7, or so.

The distribution control system 2 and the terminal management system 7 according to the above embodiment can be implemented by a single computer or can be implemented by a plurality of computers in which respective parts (functions, parts, or storage units) are divided and assigned arbitrarily.

A storage medium such as a CD-ROM, an HDD 204 or so storing the program(s) of the above embodiment can be provided as a program product domestically or abroad.

Thus, the display apparatus and the display system have been described by the embodiment, the present invention is not limited to the specifically disclosed embodiment, and variations and modifications may be made without departing from the scope of the present invention.

The present application is based on and claims the benefit of priority of Japanese Priority Application No. 2013-183717 filed Sep. 5, 2013 and Japanese Priority Application No. 2014-088994 filed Apr. 23, 2014, the entire contents of which are hereby incorporated herein by reference.

What is claimed is:

1. A display apparatus connecting, via a communication network, with a terminal management system managing terminal position information that indicates a position of the display apparatus, the display apparatus comprising:
   a position detector unit configured to detect a terminal position of other display apparatuses with respect to the display apparatus and information identifying the other display apparatuses;
   a receiver configured to receive, from the terminal management system, at predetermined time intervals, a request for acquiring the terminal position information;
   a transmitter configured to, when having received the request, transmit the terminal position information detected by the position detector to the terminal management system; and
   a display configured to display a part of a given image based on terminal position information detected by the position detector, wherein the position detector has a sensor provided at each respective one of left, right, bottom and top sides of the display apparatus, the sensor having adjacent sending and receiving parts; and wherein either:

each sensor has an identification code indicative of identification of the display apparatus and a camera configured to take images of the identification code of one of the other display apparatuses as its sending and receiving parts, the code being adjacent the camera along the respective side of the display apparatus; or each sensor has an IC tag having identification information of the display apparatus and an IC tag reader configured to acquire identification information from the IC tag of one of the other display apparatuses as its sending and receiving parts, the IC tag being adjacent the IC tag reader along the respective side of the display apparatus; or each sensor has a light emitting device configured to transmit identification information of the display apparatus and a light receiving device configured to receive identification information of one of the other display apparatuses as its sending and receiving parts, the light emitting device being adjacent the light receiving device along the respective side of the display apparatus;

wherein:

the sending and receiving parts of the sensor on a left side of the display are arranged at upper and lower positions in the sensor, respectively;

the sending and receiving parts of the sensor on a right side of the display are arranged at lower and upper positions in the sensor, respectively;

the sending and receiving parts of the sensor on a bottom side of the display are arranged at right and left positions in the sensor, respectively; and the sending and receiving parts of the sensor on a top side of the display are arranged at left and right positions in the sensor, respectively.

2. The display apparatus as claimed in claim 1, wherein the terminal position information includes identification information of the other display apparatus.

3. The display apparatus as claimed in claim 1, wherein light emitting and receiving surfaces of the sensors have inclinations of predetermined angles to the normal of a floor face on which the display apparatus is placed or sides of the display apparatus on which the sensors are installed.

4. The display apparatus as claimed in claim 3, wherein when the display apparatus is placed adjacent to the other display apparatuses and faces the same direction as the other display apparatuses face, the light emitting and receiving surfaces of the sensors of the display apparatus face light emitting and receiving surfaces of sensors of the other display apparatuses.

5. The display apparatus as claimed in claim 1, wherein the sensors have light shielding plates or light shielding surfaces that limit light emitting ranges of the light emitting devices or light receiving ranges of the light receiving devices.

6. The display apparatus as claimed in claim 1, wherein the sensors have condensing lenses that limit light emitting ranges of the light emitting devices or light receiving ranges of the light receiving devices.

7. The display apparatus as claimed in claim 1, wherein the position detector detects the terminal position information of the other display apparatus when a distance to the other display apparatus placed adjacent to the display apparatus is within a predetermined range.

8. The display apparatus as claimed in claim 1, wherein the display is configured to display a given image in cooperation with the other display apparatus.

9. The display apparatus as claimed in claim 1, wherein the sending and receiving parts of each of the sensors are arranged 180° apart.

10. A display system using a plurality of displays to display a given image, the display system connecting, via a communication network, with a terminal management system managing terminal position information that indicates a position of each of the plurality of display apparatuses, the display system comprising:

a first server configured to detect a positional relationship of plurality of displays; and a second server configured to cause the plurality of displays to display parts of a given image, respectively, based on the positional relationship detected by the first server, wherein at least one of the plurality of displays includes a position detector configured to detect terminal position of other display apparatuses with respect to the display apparatus and information identifying the other display apparatuses;

a receiver configured to receive, from the terminal management system, at predetermined time intervals, a request for acquiring the terminal position information;

a transmitter configured to, when having received the request, transmit the terminal position information detected by the position detector to the terminal management system; and a display configured to display a part of a given image based on terminal position information detected by the position detector, wherein the position detector has a sensor provided at each respective one of left, right, bottom and top sides of the display apparatus, the sensor having adjacent sending and receiving parts; and wherein either:

each sensor has an identification code indicative of identification of the display apparatus and a camera configured to take images of the identification code of one of the other display apparatuses as its sending and receiving parts, the code being adjacent the camera along the respective side of the display apparatus; or each sensor has an IC tag having identification information of the display apparatus and an IC tag reader configured to acquire identification information from the IC tag of one of the other display apparatuses as its sending and receiving parts, the IC tag being adjacent the IC tag reader along the respective side of the display apparatus; or each sensor has a light emitting device configured to transmit identification information of the display apparatus and a light receiving device configured to receive identification information of one of the other display apparatuses as its sending and receiving parts, the light emitting device being adjacent the light receiving device along the respective side of the display apparatus;

wherein:

the sending and receiving parts of the sensor on a left side of the display are arranged at upper and lower positions in the sensor, respectively;

the sending and receiving parts of the sensor on a right side of the display unit are arranged at lower and upper positions in the sensor, respectively;

the sending and receiving parts of the sensor on a bottom side of the display are arranged at right and left positions in the sensor, respectively; and the sending and receiving parts of the sensor on a top side of the display are arranged at left and right positions in the sensor, respectively.

11. The display system as claimed in claim 10, wherein the sending and receiving parts of each of the sensors are arranged 180° apart.

\* \* \* \* \*